(12) United States Patent
Bluzer

(10) Patent No.: US 7,157,708 B2
(45) Date of Patent: Jan. 2, 2007

(54) ULTRA SENSITIVE SILICON SENSOR READOUT CIRCUITRY

(75) Inventor: Nathan Bluzer, Rockville, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/239,297

(22) Filed: Sep. 30, 2005

(65) Prior Publication Data

US 2006/0081780 A1    Apr. 20, 2006

Related U.S. Application Data

(60) Provisional application No. 60/614,050, filed on Sep. 30, 2004.

(51) Int. Cl.
*G01J 5/00*    (2006.01)
(52) U.S. Cl. .................................. 250/338.1
(58) Field of Classification Search .............. 250/338.1
See application file for complete search history.

(56) References Cited

U.S. PATENT DOCUMENTS

| 6,028,309 | A | 2/2000 | Parrish et al. |
| 6,489,615 | B1 | 12/2002 | Bluzer |
| 2002/0117622 | A1* | 8/2002 | Bluzer ..................... 250/338.1 |

* cited by examiner

*Primary Examiner*—David Porta
*Assistant Examiner*—Mark R. Gaworecki
(74) *Attorney, Agent, or Firm*—Birch, Stewart, Kolasch & Birch, LLP

(57) ABSTRACT

A readout circuit for a bolometer type sensor including a pair of back-to-back temperature sensing diodes connected in an electro-thermal feedback loop including a semiconductor amplifier circuit located in an intermediate stage between a detector stage and a heat bath stage and wherein the heat generated by the amplifier equalizes the temperature between the intermediate stage and the detector stage. The readout circuitry also includes circuitry for removing local threshold voltage variations and low frequency 1/f noise components in the readout signal while providing high temperature sensitivity and relatively high voltage gain.

17 Claims, 6 Drawing Sheets

ULTRA SENSITIVE SILICON SENSOR READOUT CIRCUITRY

CLAIM OF PRIORITY

This application is a Non-Provisional application including the subject matter and claiming the priority date Under 35 U.S.C. §119(e) of Provisional application Ser. No. 60/614,050, filed Sep. 30, 2004, the contents of which are meant to be incorporated herein by reference.

RELATED APPLICATIONS

This application is related to Non-Provisional application Ser. No. 11/240,772 (Northrop Grumman Ref. No. 000800-078), entitled "Sensitive Silicon Sensor And Test Structure For An Ultra-Sensitive Silicon Sensor" filed on Oct. 3, 2005; Non-Provisional application Ser. No. 11/239,275 (Northrop Grumman Ref. No. 000775-078), entitled "Focal Plane Antenna To Sensor Interface For An Ultra-Sensitive Silicon Sensor" filed on Sep. 30, 2005; and Non-Provisional application Ser. No. 11/240,471 (Northrop Grumman Ref. No. 000801-078), entitled "Low Noise Field Effect Transistor", filed on Oct. 3, 2005.

CROSS REFERENCE TO RELATED ART

This application is also related to U.S. Pat. No. 6,489,615 entitled "Ultra-Sensitive Silicon Sensor", granted to Nathan Bluzer, the present inventor, on Dec. 3, 2002, and assigned to the assignee of this invention. U.S. Pat. No. 6,489,615 is intended to be incorporated herein by reference for any and all purposes. Also, related is U.S. Pat. No. 7,064,328 entitled "Ultra Sensitive Silicon Sensor Millimeter Wave Passive Imager", granted to Nathan Bluzer on Jan. 20, 2006. U.S. Pat. No. 7,064,328 is also assigned to the assignee of this invention and is intended to be incorporated herein by reference for any and all purposes.

BACKGROUND OF THE INVENTION

1. Field of the Invention

This invention relates generally to bolometer type radiation sensors for detecting thermal radiation and more particularly to circuitry for providing a readout signal of a bolometer sensor.

2. Related Art

Bolometers are well known in the art and comprise devices which generate a voltage output when thermal radiation is absorbed. These devices have been successfully used for infra-red (IR) imaging in the long wave infra-red (LWIR) band of the electromagnetic spectrum. Extending these devices to other spectral bands has proven relatively difficult in the past. However, efforts are currently under way to extend this capability to millimeter wave (mm) and terahertz (THz) spectral bands and thus there is a need for imagers operating in the mm and THz spectral bands. Applications for such devices include, for example, multi-spectral imaging for improved navigation, target recognition and detection as well as homeland defense applications. Such applications all require the use of bolometers. Therefore, realizing bolometers with acceptable performance with mm-THZ-LWIR cameras requires the formulation of new approaches for overcoming conventional limitations such as the requirement for faster response time and the ability to maintain sensitivity for relatively long periods. Moreover, fast response time dictates minimizing the mass of the bolometer's absorbing element.

In related application Ser. No. 11/239,297 (Northrop Grumman Ref. No. 000800-078), entitled "Sensitive Silicon Sensor And Test Structure For An Ultra-Sensitive Silicon Sensor", there is disclosed a sensor of thermal radiation comprised of a pair of silicon diodes connected in back-to-back relationship with one of the diodes being located in a detector stage, while the other diode is located in a heat bath stage along with a temperature difference amplifier. The detector stage is thermally isolated from the heat bath stage by a low thermal conductivity link which includes electrical wiring for connecting the back-to-back diodes.

In related application Ser. No. 11/239,275 (Northrop Grumman Ref. No. 000775-078), entitled "Focal Plane Antenna To Sensor Interface For An Ultra-Sensitive Silicon Sensor", there is disclosed an electrical interface between a scene to be imaged, and a bolometer type sensor located, for example in a pixel, and wherein the efficiency of each pixel is improved by means of a thermal energy concentrator including a lens and an antenna. Where a plurality of pixels are located in an array, a microantenna is provided for each pixel in the array with a common lens being provided to focus and channel incoming radiation to each microantenna. Radiation from a scene is further coupled by means of a lens and microantenna to the absorbing element of each bolometer through an AC coupling circuit including an electronic chopper implemented by means of a PIN diode, the conductivity of which is varied so as to affect the reflection coefficient of the input signal supplied through the microantenna.

In U.S. Pat. No. 6,489,615, there is disclosed in a pair of back-to-back temperature sensing silicon diodes respectively located in a detector stage and an intermediate stage and coupled to a temperature difference amplifier also located in the intermediate stage. The intermediate stage is located between the detector stage and the heat bath stage, with the intermediate stage also including an electro-thermal feedback loop which is provided by the heat generated by an amplifier located in the intermediate stage which generates heat which is proportional to the temperature difference between the difference between the detected temperatures provided by the silicon diodes. The heat provided by the amplifier acts to actively zero the temperature difference between the detector and the intermediate stage so as to eliminate any net heat flow between the detector element and the intermediate stage.

SUMMARY

It is an object of the present invention to provide sensor readout circuitry for a bolometer type sensor and wherein the sensor includes a pair of back-to-back temperature sensing diodes connected in an electro-thermal feedback loop including a semiconductor amplifier circuit located in an intermediate stage between a detector stage and a heat bath stage and wherein the heat generated by the amplifier equalizes the temperature between the intermediate stage and the detector stage. The readout circuitry also includes circuitry for providing cancellation of local threshold voltage variations and of low frequency 1/f noise components while providing high temperature sensitivity and relatively high voltage gain.

BRIEF DESCRIPTION OF THE DRAWINGS

The present invention will become more fully understood from the detailed description described hereinafter and the accompanying drawings which are provided by way of illustration only, and thus are not meant to be considered in a limiting sense, and wherein.

DETAILED DESCRIPTION OF THE INVENTION

Figure 1:
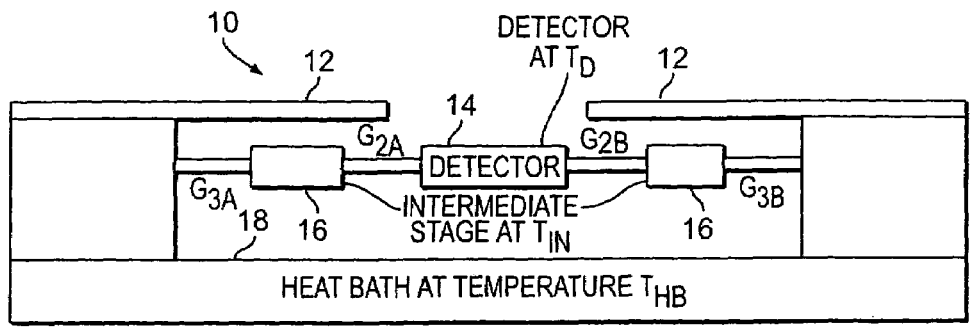
FIG. 1 is a cross section of a related art ultra-sensitive silicon sensor.

Referring now to the drawings wherein like reference numerals refer to like elements, the sensor shown FIG. 1, overcomes limitations in thermal isolation in conventional bolometers that significantly limits their sensitivity and make them unsuitable for applications in the 95 GHz (mm-wave) and Terahertz bands, and prevents them from achieving theoretical performance in the LWIR band. Specifically, calculations and measurements have revealed that conventional bolometers are insufficiently sensitive in the mm band by at least 10×; and unable to achieve theoretical performance in the LWIR spectral band by about 10×. The root cause for the sensitivity degradation in conventional bolometers is identified below together with the USSS approach for overcoming these limitations in the millimeter, Terahertz & LWIR spectrums.

FIG. 1 discloses a cross section of an Ultra Sensitive Silicon Sensor (USSS) pixel 10 in accordance with the above-referenced related art which is comprised of an antenna 12, a detector stage 14, an intermediate stage 16, and a heat bath stage 18 all formed of a silicon and being interconnected by electrical and thermal links $G_{2A}$, $G_{2B}$, $G_{3A}$ and $G_{3B}$. The antenna 12 defines and limits the spectral response of the detector stage 14.

Conventional bolometers generally do not use an antenna feed to the detector nor do they utilize an intermediate stage as shown in FIG. 1. Instead, the detector 14 is directly connected to the substrate (or heat bath) 18 through two thermal links combining $G_2$ and $G_3$, that are designed to have minimum thermal conductance. Diagrammatically, this corresponds to FIG. 1 where the intermediate stage 14 is removed and Thermal links $G_{2A}$ is combined with $G_{2B}$ to form a single thermal link $G_2$; and similarly $G_{3A}$ is combined with $G_{3B}$ to form a single thermal link $G_3$.

Thus the detector 14 in conventional bolometers is thermally loaded by linkages $G_2$ combined with $G_3$. Even though $G_2$ and $G_3$ are designed to have a poor thermal conductivity (smaller than $1 \times 10^{-7}$ W/K) they are much more conductive than the thermal conductivity between the scene, not shown, and detector 14; about $10^{-9}$ W/K for LWIR and about $10^{-11}$ W/K at 95 GHz. The small thermal conductance between the detector 14 and the scene results in a tremendous signal attenuation of about 50× at LWIR and 5000× in the 95 GHz band. Unfortunately the noise is not attenuated and this results in very poor sensitivity of about 200K in the 95 GHz band and less than the theoretically possible of 1 mK in the LWIR band.

Figure 5A:
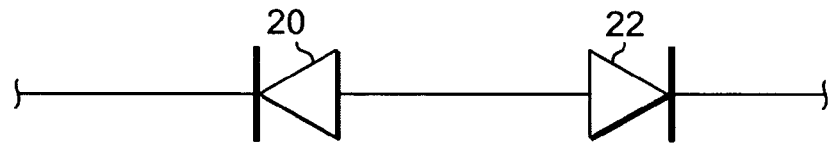
FIG. 5A is illustrative of a pair of silicon diodes connected in back-to-back circuit relationship.

In the Ultra Sensitive Silicon sensor (USSS) pixel 10 as shown in FIG. 1, the use of an intermediate stage 16 circumvents the thermal loading problem by reducing thermal loading to theoretically limited levels and thereby offers greatly improved performance. Minimizing thermal loading is automatically achieved by zeroing the temperature difference between the intermediate stage 16 and the detector stage 14. Zeroing the temperature difference between stages 14 and 16 minimizes the thermal loading on the detector 14 to approach the theoretical radiative limit and this represents greater than a 100 fold reduction of thermal loading over conventional approaches. This "zeroing" (or minimizing the temperature difference between the detector and intermediate stages) is implemented with two silicon diode temperature sensors 20 and 22, such as shown in FIG. 5A, one inside the detector stage 14 and the second collocated with the amplifier (doubling as the heater) inside the intermediate stage 16. Differences in temperature between the two silicon diode sensors 20 and 22 are amplified and the heat generated thereby zeroes the temperature difference between the intermediate and detector stages 16 and 14. Cooling from the thermal bath 18 (always below the lowest scene temperature) combined with the heat output of the amplifier provides for raising and lowering the intermediate stage temperature.

For minimum thermal loading the antenna is AC coupled to the detector stage 14. In this approach it is significant that no power is dissipated in the detector 14 by its silicon temperature sensing diode since it operates like a thermocouple. Such operation negates the need for conventional pulsed readout to provide the minimum noise bandwidth and maximum sensitivity. Additionally, this monolithic silicon approach will result in systems orders of magnitude lower in size, weight, and cost relative to conventional RF approaches.

Figure 2:
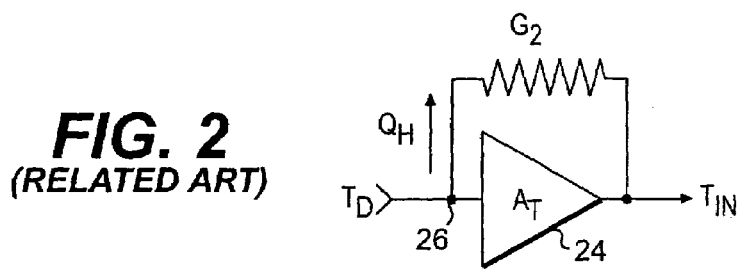
FIG. 2 is an electrical schematic diagram illustrative of electro-thermal feedback circuit implemented in the embodiment of the sensor shown in FIG. 1.

With electro-thermal feedback, the combined conductivities of $G_{1A}$ and $G_{2A}$ (FIG. 1) can be made to approach the radiative limit. The basic concept of electro-thermal feedback is illustrated in FIG. 2, where it can be shown that the effective conductance of a thermal link with conductance $G_2$ can be made to approach zero. Electro-thermal feedback in FIG. 2 employs a thermal amplifier 24 with thermal gain $A_T$. Analogous to an electrical amplifier that amplifies voltage, the thermal amplifier 24 amplifies temperature. Hence the thermal amplifiers output ($T_{IN}$) and input ($T_D$) temperatures depend on the amplifier's gain $A_T$, and $T_{IN}=A_T T_D$. The thermal loading on the amplifier's input node 26 by $G_2$ depends on the thermal conductivity of $G_2$ and the thermal amplifier's gain $A_T$. The loading on the input node depends on the thermal current $Q_H$ flowing through $G_2$, and this is given as:

$$\delta Q_H = G_2 [\delta T_D - \delta T_{IN}] = G_2 [1-A_T] \delta T_D G_{EFF} = G_2 [1-A_T] \qquad (1)$$

Where, $\delta Q_H$ is the net thermal current across $G_2$. Thus the effective loading on $T_D$ by $G_2$ depends on the thermal amplifier's gain and results in an effective conductance, $G_{EFF}$. The thermal amplifier's gain is determined to minimize the thermal load at the input node 26, at temperature $T_D$. This minimization is achieved by adjusting the thermal amplifier's gain to unity. With a unity thermal gain the effective conductance of $G_2$ ($G_{EFF}$) go to zero. The means of making the effective conductance of $G_2$ approach zero is what is needed to minimize thermal attenuation inside a bolometer and thereby maximize the sensitivity. Such an implementation is described next.

Figure 3:
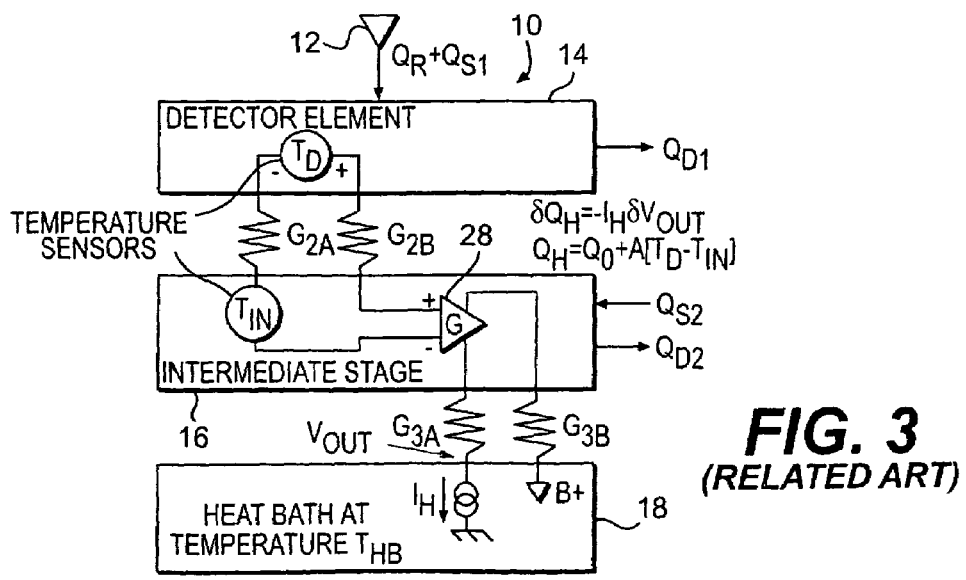
FIG. 3 is an electrical schematic diagram further illustrative of the embodiment shown in FIG. 1.

Referring now to FIG. 3, electro-thermal feedback is incorporated into each pixel 10 of a pixel array, for example, by including an intermediate temperature stage 16 whose temperature is controlled by a thermal amplifier 28 described hereafter. FIG. 3 shows the structure of a three-tier USSS pixel 10 receiving radiant energy via an antenna 12. A detector stage 14 is attached to the intermediate temperature stage 16 and the intermediate stage is attached to a heat bath 18. In a conventional bolometer 10, the detector element 14 would be directly connected to a substrate, here labeled as a thermal bath 18, through a single bridge leg, that can be represented as the sum of bridge legs $G_{2A}$ and $G_{2B}$. The bride legs would be used for electrical access and readout. The detector stage 14, of the present invention, includes a silicon diode 20 (FIG. 5A) for temperature sensing of the detector stage's temperature. Two thermal links $G_{2A}$ and $G_{2B}$ connect the detector stage 14 to the intermediate stage 16. These links provide for mechanical support and electrical readout of the detector stage's temperature. A second silicon diode temperature sensor 22 and a voltage amplifier 28 with gain G>>1 are built into the intermediate stage 16. Four thermal isolation bridges $G_{3A}$, $G_{3B}$ and $G_{3C}$, $G_{3D}$, two of which $G_{3A}$ and $G_{3B}$ are shown, provide mechanical and electrical linkage between the intermediate stage 16 and the heat bath (outside world) 18. Line $G_{3B}$ provides B+ to the amplifier 28, and the other two lines $G_{3A}$ and $G_{3C}$ (not shown) provide a constant current $I_H$, Line $G_{3D}$ (not shown) is used for removing Correlated Noise Cancellation (CNC) including removal of dc threshold offsets and 1/f noise components, to be described, once every pixel integration time. The lines $G_{3A}$, $G_{3B}$, $G_{3C}$ and $G_{3D}$ are also used as thermal conductance links between the intermediate stage 16 and the heat bath stage 18.

The USSS approach as shown in FIG. 3 achieves ideal thermal isolation with electro-thermal feedback. The electro-thermal feedback is mechanized by varying the intermediate stage's 16 temperature $T_{IN}$ in concert with changes in the detector stage's temperature $T_D$. The purpose of the thermal amplifier 28 is to equalize the intermediate stage's temperature $T_{IN}$ with the detector stages temperature, monitored by temperature sensor element $T_D$. This requires raising and lowering the intermediate stage's temperature $T_{IN}$. This is achieved by combining the heat from the thermal amplifier 28 with cooling from the heat bath 18 through conductances $G_{3A}$ and $G_{3B}$, $G_{3C}$, and $G_{3D}$. The intermediate stage's temperature $T_{IN}$ is raised or lowered by adjusting the heat output of the thermal amplifier 28 in combination with cooling from the heat bath 18. The heat bath 18 determines the minimum equalization temperature and heater power determines the maximum equalization temperature.

The temperature difference between the intermediate stage 16 and the detector stage 14 controls the thermal amplifier's heat output. The two back-to-back connected silicon temperature-sensing diodes 20 and 22 shown in FIG. 5A provide a voltage signal proportional to the temperature difference between the detector stage 14 receiving radiation from an antenna element 12 (FIG. 3), and the intermediate stage 16.

The voltage difference signal $\alpha(T_D-T_{IN})$, where $\alpha \approx -1.5$ mV/K, is amplified by gain G>>1 to provide a voltage signal $V_{OUT}$. Since the amplifier 28 operates at a constant current $I_H$, the power consumed by the amplifier, and delivered to heat to the intermediate stage 16, is proportional to the voltage $V_{OUT}$. Specifically, amplifier's output power is $Q_H=I_H[G\alpha(T_D-T_{IN})]=A[T_D-T_{IN}]$, where $A=I_H G\alpha$. Since the temperature of the intermediate stage 16 and detector stage 14 are made substantially equal, the output voltage signal $V_{OUT}$ is proportional to changes in the scene temperature $\delta T_S$.

The efficacy of the electro-thermal feedback is determined with energy balance equations at the detector stage 14 and the intermediate stages 16. The absorber element of the detector stage 14, with a heat capacity $C_D$ receives radiative energy $Q_R$ via antenna 12 from a remote scene, not shown, and radiation shields $Q_{S1}$, also not shown. The detector stage 14 also radiates energy $Q_{D1}$ through a $4\pi$ angle and contacts the intermediate stage 16 through two thermal links $G_{2A}+G_{2B}=G_2$. The heat capacity of intermediate stage 16 is $C_{IN}$, and it is connected to the heat bath 18 through thermal links $G_{3A}$ and $G_{3B}$. The intermediate stage receives radiation $Q_{S2}$ from the radiation shields, not shown, and radiates energy $Q_{D2}$. The energy balance equation at the detector stage is given by:

$$(Q_R - Q_{D1}) + (Q_{AS} - Q_{AE}) + \int_{T_D}^{T_{IN}} G_2(T)dT = \int_{T_D}^{T_D+\delta T_D} j\omega C_D(T)dT \quad (2)$$

In Equation 2, $Q_R$ ($Q_{D1}$) is the radiation directly received (emitted) by the detector stage 14; $Q_{AS}$ ($Q_{AE}$) is the radiation directly received (emitted) by the antenna 12 and channeled into (removed from) the detector 14, and $C_D$ is the heat capacity of the detector stage 14. Similarly, the energy balance equation at the intermediate stage is given by:

$$-Q_{D2} + Q_{S2} + Q_H + \int_{T_{IN}}^{T_{HB}} G_3(T)dT + -\int_{T_D}^{T_{IN}} G_2(T)dT = \int_{T_{IN}}^{T_{IN}+\delta T_{IN}} j\omega C_{IN}(T)dT \quad (3)$$

In Equation 3, $Q_{D2}$ ($Q_{S2}$) is the radiation emitted (received) directly by the intermediate stage 16, $Q_H$ is the heat delivered by the electro-thermal feedback voltage amplifier 28 to the intermediate stage 16, and $C_{IN}$ is the heat capacity of the intermediate stage 16. Taking the differentials of Equations 2 and 3, two new linearized equations are obtained, namely:

$$[G_R+G_{AS}]\delta T_S-[G_{D1}+G_2+j\omega C_D]\delta T_D+[G_2]\delta T_{IN}=0 \quad (4)$$

and, $$-[G_{D2}+G_2+G_3+j\omega C_{IN}]\delta T_{IN}+G_2\delta T_D+\delta Q_H=0 \quad (5)$$

Terms $G_R$, $G_{D1}$, $G_{AS}$, $G_{D2}$, $G_{S2}$, and $\delta Q_H$ are obtained by taking the temperature differentials of $Q_R$, $Q_{D1}$, $Q_{AS}$, $Q_{D2}$, $Q_{S2}$, and $Q_H$, respectively. The antenna 12, which in actuality is a microantenna, is held at the heat bath temperature, and its temperature differential is $\delta Q_{AE}=G_{AE}\delta T_{HB}=0$. In addition, the intermediate stage 16 is shielded by the heat bath 18, hence the differential of the energy it receives directly is $\delta Q_{S2} = G_{S2} \delta T_{HB} = 0$.

Temperature tracking by the intermediate stage 16 of the detector stage's temperature 14 is revealed by Equation 5 when the expression $\delta Q_H = A\delta T_D - A\delta T_{IN}$ is included the relationship between the detector stage and intermediate stage temperatures is given as:

$$\delta T_{IN} = \frac{(A+G_2)}{(G_2+G_{D2}+G_3+A+j\omega C_{IN})} \delta T_D \qquad (6)$$

Incorporating a large electro-thermal feedback the coefficient A in the design, makes A large relative to all the other conductive terms in Equation 6, i.e., $A \gg \{G_2, G_3, G_{D2}\}$, thereby achieving a condition where the differential temperature changes in the detector stage 14 are essentially equal to intermediate stage 16 changes. This condition is equivalent to no AC thermal current through $G_2$, and its effective thermal conductivity approaches zero.

The Ultra Sensitive Silicon Sensor's (USSS) pixel readout circuits disclosed herein are critical to achieving electro-thermal feedback that leads to high performance. The readout circuits employ the minimum number of components thereby facilitating manufacturability, a small foot print (<50 μm×50 μm), and low power consumption (<30 μW). Additionally, the readout circuits have several thermal and electrical requirements. The thermal requirements include incorporation of the readout circuit into the electro-thermal feedback loop for temperature equalization between the detector and intermediate stages. The electrical requirements include low noise, high temperature sensitivity and large voltage gain, leading to a large electro-thermal coefficient A.

Operation of the electro-thermal loop requires temperature sensing elements and for maximum simplicity and lowest power consumption, silicon p/n junction thermocouples are employed and they will be described first. Two different circuit embodiments for implementing the electro-thermal feedback are described. One embodiment utilizes an inverting amplifier and the other a non-inverting amplifier. These embodiments, moreover, incorporate means for improving their sensitivity. The sensitivity improvement stems from incorporating into their readout circuits means to cancel local MOS threshold voltage variations and suppression of low frequency 1/f noise. The MOS threshold offsets and 1/f noise canceling technique are referred to as Correlated Noise Cancellation (CNC). With CNC sensitivity degradations that would be produced by MOS threshold variations and 1/f noise are now circumvented.

Temperature sensing and compensation are built into each USSS readout circuit. The temperature sensing is used to determine the temperature difference between the detector stage 14 and intermediate stage 16 and provides an output that controls the electro-thermal feedback loop that zeroes this temperature difference between these stages. Effects of response offsets in the temperature sensing diodes 20 and 22 (FIG. 5A) are calculated and techniques for their cancellation are provided. Response offsets between the detector and intermediate stage temperature sensing diodes 20 and 22, if not removed, would corrupt the operation of the electro-thermal feedback loop. These issues are addressed starting by describing the temperature sensing diodes 20 and 22 used for detecting the temperature difference between the detector stage 14 and intermediate stage 16.

The temperature sensing diodes 20 and 22 of the present invention are selected so as to satisfy three major requirements: first, high differential temperature sensitivity; second, being made of technologically mature silicon material, and third, they consume zero power and thereby minimize 1/f noise and readout errors due to self heating. These requirements are satisfied with two silicon p/n junction diodes 20 and 22 connected back to back, as shown in FIG. 5A. Silicon diodes 20 and 22 sense the detector's and intermediate's stage temperatures, respectively, and provide a voltage signal proportional to the temperature difference between the detector stage 14 and intermediate stage 16. The operation of a silicon diode is well known; however, a description is provided below.

Figure 4:
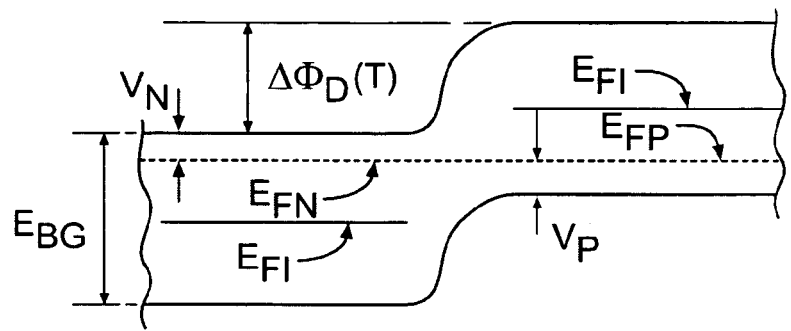
FIG. 4 is an electrical band diagram of a single silicon p-n junction.

Referring now to FIG. 4, it is well known that in a semiconductor the band gap, $E_{BG}$, and the Fermi level change with temperature. At zero current flow, the Fermi levels of the n-type region lines up with the Fermi level of the p-type diode region. This is shown in FIG. 4 where at zero current flow the n-type Fermi level $E_{FN}$ is lined up with the p-type Fermi level $E_{FP}$. This alignment results in a potential offset $\Delta\Phi_D(T_D)$ between the conduction bands across the junction. This potential offset depends on the band gap and the Fermi levels $E_{FN}$, and $E_{FP}$. Since the band gap and the Fermi levels are temperature dependent, it follows that the potential offset $\Delta\Phi_D(T_D)$ is also temperature dependent. The differential temperature sensor in accordance with the subject invention is based on this phenomenon.

In FIG. 4, the band diagram shown is of a single silicon p/n junction. The intrinsic Fermi level, $E_{FI}$ is shown in the respective n-type and p-type diode segments. The extrinsic Fermi levels line up at zero current flow. $V_N$ ($V_P$) is the potential difference between the conduction (valence) band $E_{FN}$ ($E_{FP}$) and the extrinsic Fermi level. The Silicon band gap is labeled as $E_{BG}$. The potential difference is produced by the space charge formed at the p/n junction. Positive space charge is formed at the N-side and negative space charge is formed at the P-side. The positive and negative space charge at the diode's p/n junction thus acts as a temperature dependent voltage source.

The value and temperature dependence of a p/n junction's potential offset $\Delta\Phi_D(T_D)$ is calculated using a well known procedure and can be expressed as:

$$q\Delta\Phi_D(T_D) = E_{BG} - [qV_N + qV_P] \qquad (7)$$

The right side of Equation 7 is a function of temperature, and the temperature dependence for the Silicon band gap is:

$$E_{BG} = kT_D \, \mathrm{Ln}\!\left(\frac{N_C N_V}{n_i^2}\right) \qquad (8)$$

Where k is Boltzmann's constant and T is the temperature in degrees Kelvin. The expressions for $N_V$ and $N_C$ will drop out when all the terms are summed in Equation 7. The explicit temperature dependant expression for $V_N$ and $V_P$ can be written as:

$$V_N = kT_D \, \mathrm{Ln}\!\left(\frac{N_C}{n_{no}}\right) \qquad (9)$$

$$V_P = kT_D \, \mathrm{Ln}\!\left(\frac{N_V}{p_{po}}\right)$$

where, $p_{po}$ and $n_{no}$ are the equilibrium concentration of electrons and holes, respectively. Substituting Equations 8 and 9 into Equation 7 and simplifying, obtained is:

$$q\Delta\Phi_D(T_D) = kT_D \ln\left(\frac{n_{no}p_{po}}{n_i^2}\right) \cong kT_D \ln\left(\frac{N_A N_D}{n_i^2}\right) \quad (10)$$

The approximations in Equation (10) assume that the equilibrium electron concentration is equal to the donor doping level, $n_{no} \cong N_D$, and the equilibrium hole concentration is equal to the acceptor concentration $p_{po} \cong N_A$. The explicit expression for $(n_i)^2$ is also obtained from Sze and for Silicon is expressed as:

$$n_i^2 = \left[4.9 \times 10^{15}\left(\frac{m_{de}m_{dh}}{m_o^2}\right)^{3/4} T^{3/2} \exp\left(\frac{-E_{BG}}{2kT_D}\right)\right]^2 \quad (11)$$

The effective hole $m_{dh}$ and electron $m_{de}$, masses are readily obtained from a handbook in terms of the rest mass $m_o$. Performing all these substitutions, the ration of the effective masses in Equation 10 is $(m_{de}m_{dh}/m_o^2)^{3/4} = 0.62849$. An explicit expression for the Silicon bandgap as a function of temperature can be stated as:

$$E_{BG}(V) = q\left(1.170 - \frac{4.73 \times 10^{-4} T_D^2}{636 + T_D}\right) \quad (12)$$

Substituting Equations 10 and 11 into Equation 9, and after some simplifications, obtained is:

$$\Delta\Phi_D(T_D) = \frac{kT_D}{q} \ln\left(\frac{N_A N_D}{9.49 \times 10^{30} T_D^3}\right) + 1.170 - \frac{4.73 \times 10^{-4} T_D^2}{636 + T_D} \quad (13)$$

Equation 13 represents the temperature dependence of the potential offset between the conduction and valance bands across a diode. The temperature dependence of $\Delta\Phi_D(T_D)$ is readily computed by taking the derivative of Equation 13 and can be stated as, $$\frac{\partial \Delta\Phi_D(T_D)}{\partial T_D} = \frac{k}{q} \ln\left[\frac{N_A N_D}{9.49 \times 10^{30} T_D^3}\right] - \frac{3k}{q} - 4.73 \times 10^{-4}\left[1 - \left(\frac{636}{636 + T_D}\right)^2\right] \quad (14)$$

Evaluating Equation 14, assuming $N_A \cong N_D \cong 10^{17}$ dopants/cm$^3$ and $T_D = 300$K, the value for the differential temperature signal $\partial\Phi_D(T_D)/\partial T_D = -1.3888$ mV/K. This represents at least a 20 fold increase in temperature sensitivity than metallic thermocouples. The negative sign indicates that as temperature $T_D$ increases the diode's potential output signal decreases.

Figure 5B:
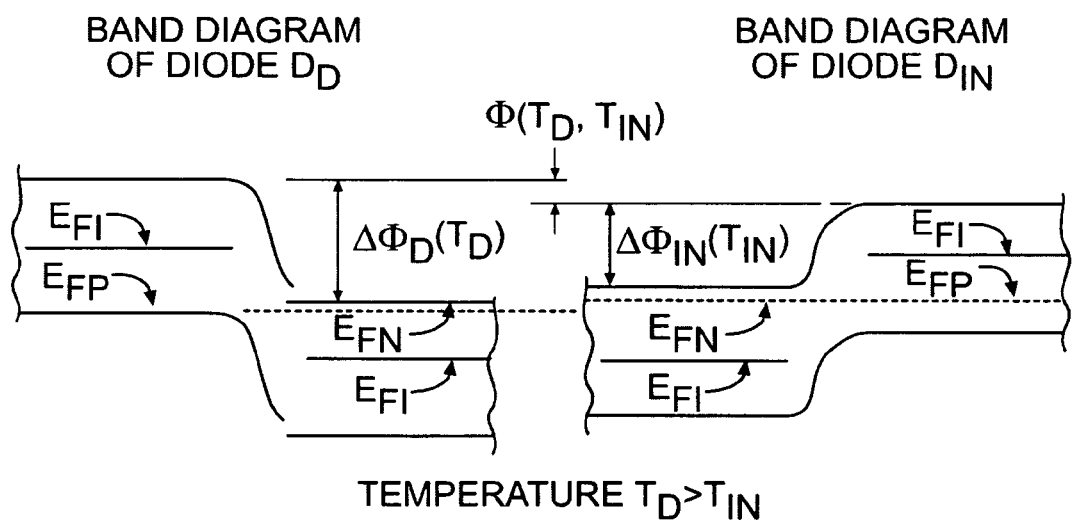
FIG. 5B is a band diagram illustrative of the back-to-back diode shown in FIG. 5A at different temperatures.

Referring now to FIGS. 5A and 5B, connecting two diodes 20 and 22 as shown in FIG. 5A back-to-back in series provides a signal directly proportional to the temperature difference between the detector and intermediate stages. FIG. 5B is illustrative of the band diagram of two diodes 20 and 22 connected in series and the potential produced by having each at a different temperature. The diodes 20 and 22 are thermally isolated from each other with diode 20 ($D_D$) being at the detector's temperature $T_D$, and diode 22 ($D_{IN}$) being at the intermediate stage's temperature $T_{IN}$. The total potential drop produced across the two diodes 20 and 22 is:

$$_{0c1)}(T_D, T_{IN}) = \Phi_{D}(T_D) - \Phi_{rN}(T_{IN}) \quad (15)$$

Where expressions for $\Delta\Phi_D(T_D)$ and $\Delta\Phi_{IN}(T_{IN})$ are given by Equation 13. If the diodes 20 and 22 are at the same temperature ($T_D = T_{IN}$), there is no potential offset produced thereby, and as expected $\Delta\Phi(T_D, T_{IN}) = 0$. The temperature sensitivity computed with Equation 14 is consistent with the values used in analyzing the performance of the electro-thermal feedback and the USSS readout circuit of the subject invention. Temperature compensation in the readout circuit is considered next.

In FIG. 5A, two Silicon diodes 20 and 22, at temperatures $T_D$ and $T_{IN}$, respectively, are connected back to back to provide a potential signal dependent on their temperature difference. The temperature dependence of $\Delta\Phi(\Delta T_D, T_{IN})$ is used to provide a differential signal related to temperatures $T_D$ and $T_{IN}$.

Temperature compensation inside the readout circuit of the subject invention is needed to insure that only the temperature difference between the sensing silicon p/n junction diodes effect the electro-thermal feedback loop. The USSS readout circuit needs to take into account the temperature dependence of the transistors used to implement the electro-thermal feedback loop. The temperature dependence of the threshold voltage is computed with an analysis that can be found in many semiconductor textbooks. The threshold voltage of a MOS (metal oxide silicon) field effect transistor (MOSFET) is known to vary with temperature, and this variation with temperature can be stated as:

$$V_T = \Delta\Phi_D(T_{IN}) + \sqrt{2\epsilon_s q N_D[\Delta\Phi_D(T_{IN})]}/C_i \quad (16)$$

where $\epsilon_s$ is the dielectric constant of a MOSFET substrate, $N_D$ is the donor concentration in the substrate, and $C_i$ is the MOSFET gate capacitance per unit area. Equation (16) includes the potential shift $\Delta\Phi_D(T_D)$ that the potential applied to the MOS gate needs to affect so that the FET channel will be biased into weak inversion and thereby start the flow of current in the channel. The potential shift moves the channel from flat band of the N type substrate to weak inversion which corresponds to the potential of p-type silicon. Accordingly, in Equation (16), the notation of $2\psi_B$ has been replaced by $\Delta\Phi_D(T_D)$. It should be noted that $\Delta\Phi_D(T_D)$ also directly represents the diode's thermal EMF that will be detailed later. Thus the variation in the MOS threshold voltage with temperature is readily computed by taking the derivative of Equation (16) and after some rearrangement, the expression obtained is:

$$\frac{\partial V_T}{\partial T_{IN}} = \frac{\partial \Delta\Phi_D(T_{IN})}{\partial T_{IN}}\left[1 + \frac{1}{C_i}\sqrt{\frac{\epsilon_s q N_D}{2\Delta\Phi_D(T_{IN})}}\right] \quad (17)$$

In calculating Equation (17) $T_D$ has been replaced with $T_{IN}$ to reflect the fact that the MOSFET is at the intermediate temperature $T_{IN}$ and not at the detector temperature $T_D$. It is evident that the differential temperature dependence of the threshold voltage is larger than the differential temperature dependence of the detector's p/n diode, but has the same sign. The increase in the relative value of the threshold voltage's differential temperature dependence is given by the second term in the brackets of Equation (17). This term is evaluated by substituting $N_D \cong 10^{16}$, $C_i \cong d_{OX}/\in_{OX}$ with $d_{OX} \cong 10^{-6}$ cm and $\in_{OX} = 3.9 \in_O$, $\in_{Si} = 11.9 \in_O$ and the potential difference $\Delta\Phi_D(T_D) \cong 0.8V$. Substituting all these values into Equation (17) the differential temperature dependence of the threshold voltage can be stated as:

$$\frac{\partial V_T}{\partial T_{IN}} = \frac{\partial \Delta\Phi_D(T_{IN})}{\partial T_{IN}}[1 + 0.1189] \quad (18)$$

Thus, an n/p diode and MOS transistor have temperature dependences within 12%. It should be evident that compensation of the temperature dependence of the MOS threshold voltage is important and the circuit needs to be symmetric to cancel the temperature dependence of the readout circuit's transistors. This temperature compensation is built into the pixel readout circuits using inverting and non-inverting amplifiers as will be explained below.

Additionally, the readout circuits of the present invention have been designed to accept signals from the two diode temperature sensors 20 and 22 with very high impedance. The diode temperature sensor's output drive capability is inversely related to the diode temperature sensitivity. The differential temperature sensitivity of the series back-to-back connected diodes 20 and 22 (FIG. 5A) is a function of the donor ($N_D$) and acceptor ($N_A$) concentrations is given by Equation 14. Improved sensitivity can be further obtained with smaller donor and acceptor concentrations. However, with lower donor and acceptor concentrations, the back to back diodes' impedance is increased and the drive capability reduced. Hence the pixel readout circuits are designed to have a high impedance to minimize drive requirements by the p/n diodes.

The voltage signal produced by the back-to-back diodes 20 and 22 originates from the space charge formed at the diode's junction, which change with temperature. Thus the impedance of this circuit corresponds to that of two charged capacitors connected in series. The charge across each capacitor is produced at the diodes' 20 and 22 p/n junctions and changes with temperature. Clearly, the impedance of the two series capacitances is very high and consequently has very limited drive capability. With such high impedance, the only circuit the two back-to-back diodes can most readily drive is the gate of a MOSFET. To minimize attenuation, the MOS gate capacitance should be much smaller than each of the two diode p/n junction capacitances. For the donor ($N_D$) and acceptor ($N_A$) concentration of $10^{17}/cm^3$, the junction capacitance for a 5 μm disk is about 6 fF. This very small capacitance demands an amplifier with a very low effective input capacitance. Field effect transistors (FETs) are excellent candidates and are used in the present invention in two different circuit types to amplify the signal from the two back to back temperature sensing diodes. The diode capacitance can be increased by increasing the donor and/or acceptor concentration. However, this will make things worse. The space charge signal increases logarithmically with $N_D$ and $N_A$, while the capacitance increases faster, as the square root of these concentrations. Hence the voltage signal would decrease faster than the reduction in loading leading to a poorer performance. The selection of, approximately, $N_D$ and $N_A$ of about $10^{17}/cm^3$ has proved to be a good compromise Referring now to FIG. 6, a first circuit 32 is shown for implementing the electro-thermal loop is an inverting symmetrical FET amplifier. The FET inverting amplifier of FIG. 6 includes electro-thermal feedback as well as provisions for threshold and 1/f noise cancellation elements. For clarity, the correlate noise cancellation (CNC) switches for removing the threshold offsets and low frequency 1/f noise are omitted from FIG. 6, but are shown, for example, in FIG. 8. The inverting amplifier includes two temperature sensors 20 and 22 driving the FET gate of transistor $T_1$. The detector stage's temperature sensor is a diode 20 ($T_D$) and the intermediate stage's temperature sensor is with a second diode 22 ($T_{IN}$). The temperature sensing diodes have the same temperature characteristics.

The electro-feedback circuit of this invention incorporates provisions for temperature sensing and heating to equalize the temperatures of the intermediate stage 16 with the temperature of the detector stage 14. A cascode stage 34, implemented by a FET transistor $T_3$ connected to the drain of FET $T_1$, is added to minimize capacitive loading on the two diode temperature sensors 20 and 22. As noted above, the CNC switching circuit elements are left out for clarity. The temperature dependence of the amplifier 32 is cancelled by utilizing a symmetrical design. The temperature dependent threshold voltage of the FET $T_1$ is cancelled with FET $T_2$. $T_1$ and the $T_2$ operate at the same current levels to achieve temperature cancellation, and threshold cancellation, to first order. This cancellation is important for the temperature dependence of the threshold voltage is comparable to the temperature dependence of the temperature sensing p/n junction silicon diodes 20 and 22.

Eliminating the inverting amplifier's 32 temperature dependence is important for the operation of the electro-thermal feedback loop. Additionally, the effectiveness of the electro-thermal feedback loop depends on the $T_1/T_3$ amplifier's voltage gain. $T_3$ has been included in the circuit in FIG. 6 to minimize the Miller capacitance at the gate input of the $T_1$ and thus maximize the voltage gain. This is further facilitated by utilizing high impedance current generators. Thus, amplification of the input signal produced from the two back-to-back diode thermocouples 20 and 22 depends on two factors. First, attenuation of back-to-back diode thermocouples voltage signal due to loading by the amplifiers input impedance. Second, this attenuation will be offset by the voltage gain that depends on the transconductance of $T_1/T_3$ times the impedance at the output node 36 V(OUT).

Analysis of this inverting circuit is done in the high frequency limit to determine effects of parasitic loading. The output signal due to the temperature difference between the detector 14 and intermediate stage 16 diodes is computed using superposition, and the aid of an equivalent circuit as shown in FIG. 7.

Figure 7:
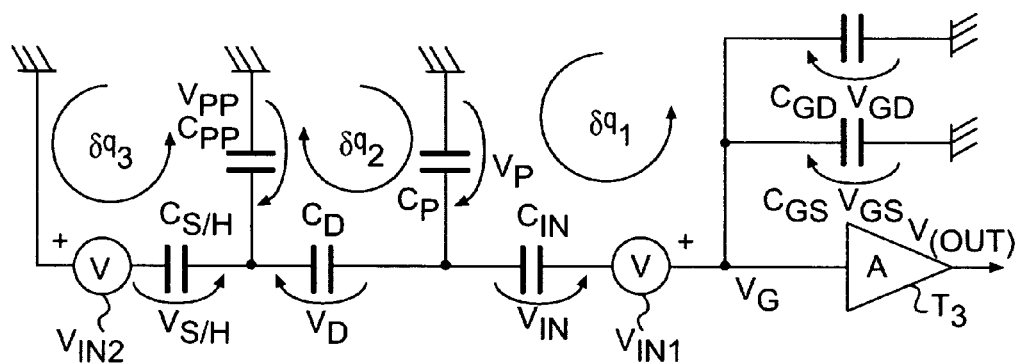
FIG. 7 is an electrical equivalent circuit diagram of the embodiment shown in FIG. 6.

Referring now to the equivalent circuit FIG. 7, the inverting amplifier, composed of $T_1/T_3$ and the current generator load, has been formulated to have large voltage gain G. The output impedance of $T_1$ is very high and a second stage $T_3$ is used to increase this impedance and minimize capacitive loading when driving the output bus 38, and increase the voltage gain. The threshold voltage (including 1/f noise components) of $T_1$ is represented as $V_{IN1}$. Relative to the diode thermocouples, the capacitance of $T_2$ is very small and its threshold voltage (including 1/f noise components) is represented as a voltage $V_{IN2}$. There are several parasitic capacitances included in this analysis. Capacitance $C_P$ is the parasitic capacitance between the substrate and the P+ regions of the temperature sensing diodes 20 and 22. Capacitance $C_{PP}$ is the parasitic capacitance between the detector's N+ thermocouple region of diode 20 and the substrate. Capacitance $C_{GD}$ is the parasitic capacitance between the gate of $T_1$ and the drain. Capacitance $C_{GS}$ is the parasitic capacitance between the gate of $T_1$ and the source. Because the thermocouple sensing diodes operate as thermocouples with zero equilibrium current, they are best represented in the analysis as capacitors with temperature dependent charge. This is a high frequency analysis and represents the worst case for impedance loading. Again, for clarity, CNC switches are omitted in this analysis.

The analysis derives the output voltage V(OUT) as a function of changes in the voltage across the two thermocouple diodes 20 and 22. Superposition is used to derive the transfer function between each thermocouple 20 and 23 and the output V(OUT). The output voltage from the detector stage diode thermocouple diode 20 is derived as follows. The three-charge currents $\delta q_1$, $\delta q_2$, and $\delta q_3$, are produced with temperature changes in the two thermocouples temperature sensing diodes 20 and 22. Mesh equations for each one of these three charge currents provide expressions that are used to compute the resulting signal applied at the gate of the $T_1$. The three equilibrium mesh equations can be expressed as:

$$V_P + V_{IN} + V_{IN1} - V_G = 0 \tag{19}$$

$$V_P + V_D - V_{PP} = 0 \tag{20}$$

$$-V_{IN2} + V_{S/H} - V_{PP} = 0 \tag{21}$$

Rewriting Equations 19, 20 and 21 in terms of charges on capacitors three equations are obtained and are given as:

$$\frac{Q_P}{C_P} + \frac{Q_{IN}}{C_{IN}} + V_{IN1} - V_G = 0 \tag{22}$$

$$\frac{Q_P}{C_P} + \frac{Q_D}{C_D} - \frac{Q_{PP}}{C_{PP}} = 0 \tag{23}$$

$$-V_{IN2} + \frac{Q_{S/H}}{C_{S/H}} - \frac{Q_{PP}}{C_{PP}} = 0 \tag{24}$$

A change in charge on the detector's thermocouple diode 20 by $\Delta Q_D$ will produce a transient flow of three charge currents and they will result in a voltage change on the gate of $T_1$. The three Equations governing these changes are:

$$\frac{Q_P - \delta q_1 - \delta q_2}{C_P} + \frac{Q_{IN} - \delta q_1}{C_{IN}} + V_{IN1} - V_G - \delta V_G = 0 \tag{25}$$

$$\frac{Q_P - \delta q_1 - \delta q_2}{C_P} + \frac{Q_D + \Delta Q_D - \delta q_2}{C_D} - \frac{Q_{PP} + \delta q_2 + \delta q_3}{C_{PP}} = 0 \tag{26}$$

$$-V_{IN2} + \frac{Q_{S/H} - \delta q_3}{C_{S/H}} - \frac{Q_{PP} + \delta q_2 + \delta q_3}{C_{PP}} = 0 \tag{27}$$

The voltage on the gate of $T_1$ changes as the transient current $\delta q_1$ changes the charge on the gate capacitance $C_{GS}$ and $C_{GD}$ and this results in:

$$\delta V_G = \left(\frac{\delta q_1}{C_{GS} + C_{GD}}\right) \tag{28}$$

Using Equation 28 to get rid of $\delta V_G$ in Equation 25 and combining Equations 25, 26, and 27 with Equations 22, 23, and 24, what is obtained after grouping of terms are three new equations:

$$\left(\frac{1}{C_P} + \frac{1}{C_{IN}} + \frac{1}{C_{GS} + C_{GD}}\right)\delta q_1 + \frac{\delta q_2}{C_P} = 0 \tag{29}$$

$$\frac{\delta q_1}{C_P} + \left(\frac{1}{C_P} + \frac{1}{C_D} + \frac{1}{C_{PP}}\right)\delta q_2 + \frac{\delta q_3}{C_{PP}} = \frac{\Delta Q_D}{C_D} \tag{30}$$

$$\frac{\delta q_2}{C_{PP}} + \left(\frac{1}{C_{PP}} + \frac{1}{C_{S/H}}\right)\delta q_3 = 0 \tag{31}$$

The expression for $\delta q_1$ in terms of $\Delta Q_D$ and the various capacitances in the equivalent circuit in FIG. 7 is obtained by using Equation 31 to get rid of the variable $\delta q_3$ and Equation 29 to get rid of variable $\delta q_2$ in Equation 30, and then solving for $\delta q_1$ in terms of $\Delta Q_D$, there result is:

$$\delta q_1 = \frac{-\Delta Q_D}{C_D} \frac{1}{\left(\frac{1}{C_{GS} + C_{GD}} + \frac{1}{C_{IN}}\right)\left(1 + \frac{C_P}{C_D} + \frac{C_P}{C_{S/H} + C_{PP}}\right) + \left(\frac{1}{C_D} + \frac{1}{C_{S/H} + C_{PP}}\right)} \tag{32}$$

Combining Equation 28 with Equation 32, the change in the FET inverting amplifiers gate voltage due to changes in the detector stage temperature is obtained which can be expressed as:

$$\delta V_G(\Delta T_D) = \tag{33}$$

$$\frac{-\Delta Q_D}{C_D} \frac{1}{\left[1 + \left(\frac{1}{C_{IN}} + \frac{1/C_D + 1/(C_{S/H} + C_{PP})}{1 + C_P/C_D + C_P/(C_{S/H} + C_{PP})}\right)(C_{GS} + C_{GD})\right][1 + C_P/C_D + C_P/(C_{S/H} + C_{PP})]}$$

The negative sign in front of Equation 33 indicates that the voltage polarity assigned to $\delta V_G$ in response to the change $\Delta Q_D$ on the detector thermocouple is in the wrong direction. However, it should be noted if the parasitic capacitors $C_{PP}$ and $C_P$ are made very small, the coupling would approach unity between the detector's diode thermocouple 20 and the gate of $T_1$. The gate capacitance of the $T_1$, $C_{GS} + C_{GD}$, should be made as small as possible to maximize response. A smaller FET gate capacitance is possible by minimizing the $T_1$'s channel concentration.

The output voltage V(OUT) will depend on the voltage gain of the inverting amplifier $T_1$. The gain of the $T_1$ is approximated as a product of the transconductance times the output impedance. At low operating current (about one microamp), the transconductance is almost geometry independent and depends only on the drain current. The output impedance is determined by the output impedance at $T_3$ and the impedance of the current generator $I_H$. With proper care, both of these can be made to be very large, and a voltage gain of several tens of thousand between the gate and the drain can be achieved. Hence, the gate voltage on $T_1$ given by Equation 33 will be amplified be more than ten thousand times.

The transfer function between the gate voltage of $T_1$ and the intermediate stage thermocouple diode 22 is derived next. Calculation of the effect of changes in the intermediate stage thermocouple 22 is made the same way as for the detector stage thermocouple diode 20. Transient changes in the three currents $\delta q_1$, $\delta q_2$, and $\delta q_3$, will occur with changes in the temperature of the intermediate stage diode thermocouple 22. Mesh equations for each one of these three transient changes in the charge currents $\delta q_1$, $\delta q_2$, and $\delta q_3$ provide expressions that can be used to derive the resulting voltage signal applied at the gate of the $T_1$. The three equilibrium mesh equations have been previously obtained and are the same as Equations 22, 23, and 24. Modifying Equations 29 and 30 to include $\Delta Q_D=0$, and instead have a change in $\Delta Q_{IN}$, and a set of three Equations are obtained which can be expressed as:

$$\frac{Q_P - \delta q_1 - \delta q_2}{C_P} + \frac{Q_{IN} + \Delta Q_{IN} - \delta q_1}{C_{IN}} + V_{IN1} - V_G - \delta V_G = 0 \quad (34)$$

$$\frac{Q_P - \delta q_1 - \delta q_2}{C_P} + \frac{Q_D - \delta q_2}{C_D} - \frac{Q_{PP} + \delta q_2 + \delta q_3}{C_{PP}} = 0 \quad (35)$$

$$-V_{IN2} + \frac{Q_{S/H} - \delta q_3}{C_{S/H}} - \frac{Q_{PP} + \delta q_2 + \delta q_3}{C_{PP}} = 0 \quad (36)$$

The voltage on the gate of $T_1$ changes as the current $\delta q_1$ changes and has been given before by Equation 28. Using Equation 28 to get rid of $\delta V_G$ in Equation 34 and combining Equations 34, 35, and 36 with Equations 22, 23, and 24, after grouping of terms three new equations are obtained which are:

$$\left(\frac{1}{C_P} + \frac{1}{C_{IN}} + \frac{1}{C_{GS} + C_{GD}}\right)\delta q_1 + \frac{\delta q_2}{C_P} = \frac{\Delta Q_{IN}}{C_{IN}} \quad (37)$$

$$\frac{\delta q_1}{C_P} + \left(\frac{1}{C_P} + \frac{1}{C_D} + \frac{1}{C_{PP}}\right)\delta q_2 + \frac{\delta q_3}{C_{PP}} = 0 \quad (38)$$

$$\frac{\delta q_2}{C_{PP}} + \left(\frac{1}{C_{PP}} + \frac{1}{C_{S/H}}\right)\delta q_3 = 0 \quad (39)$$

Comparing Equations 37, 38 and 39 to Equations 29, 30 and 31, the symmetry can be readily seen. Deriving the expression for $\delta q_1$ in terms of $\Delta Q_{IN}$ and the various capacitances in the equivalent circuit of FIG. 7 is obtained by using Equation 39 to get rid of the variable $\delta q_3$ in Equation 38. Next, the resulting Equation 38 replaces $\delta q_2$ in Equation 37, and solving for $\delta q_1$ in terms of $\Delta Q_{IN}$ the result is:

$$\delta q_1 = \frac{\Delta Q_{IN}}{C_{IN}} \frac{1}{\frac{1}{C_{GS} + C_{GD}} + \frac{1}{C_{IN}} + \frac{1/C_D + 1/(C_{S/H} + C_{PP})}{1 + C_P/C_D + C_P/(C_{S/H} + C_{PP})}} \quad (40)$$

Combining Equation 28 with Equation 40, the change in the gate voltage of inverting amplifier $T_1$ as a function of temperature changes in the intermediate stage is:

$$\delta V_G(\Delta T_{IN}) = \quad (41)$$

$$\frac{\Delta Q_{IN}}{C_{IN}} \frac{1}{1 + \left[\frac{1}{C_{IN}} + \frac{1/C_D + 1/(C_{S/H} + C_{PP})}{1 + C_P/C_D + C_P/(C_{S/H} + C_{PP})}\right](C_{GS} + C_{GD})}$$

The transfer functions for the detector stage's 14 (Equation 33) and intermediate stage's 16 (Equation 41) diode thermocouples 20 and 22, respectively, are different. For proper operation, the sign difference between these transfer functions is correct. Decreasing the temperature of the detector stage 14 requires automatic cooling of the intermediate stage 16. The transfer function (Equation 33) will produce a negative signal on the gate of $T_1$ and V(OUT) will become more positive (closer to ground). A more positive V(OUT) will reduce the intermediate stage 16 temperature until it converges to the detector stage 14 temperature. Similarly, if the intermediate stage 16 temperature is too high (decreasing the thermocouple charge ($\Delta Q_{IN}$), the transfer function (Equation 41) will cause a smaller voltage on the gate of $T_1$ and this will change V(OUT) to be more positive (or closer to the ground). As V(OUT) moves closer to ground, the quiescent power consumed by the amplifier 32 decreases causing the intermediate stage 16 to cool toward the detector stage 14 temperature.

Qualitatively, the frequency analysis has demonstrated that the electro-thermal feedback loop is working correctly. However, proper operation requires that, besides the sign, the transfer functions given by Equations 33 and 41 be identical. This is readily achieved by equating the two transfer functions and obtaining the requirements for equality by adjusting the relative values of $C_D$ and $C_{IN}$ to be, $$C_{IN} = [1 + C_P/C_D + C_P/(C_{S/H} + C_{PP})]C_D \quad (41)$$

Figure 6:
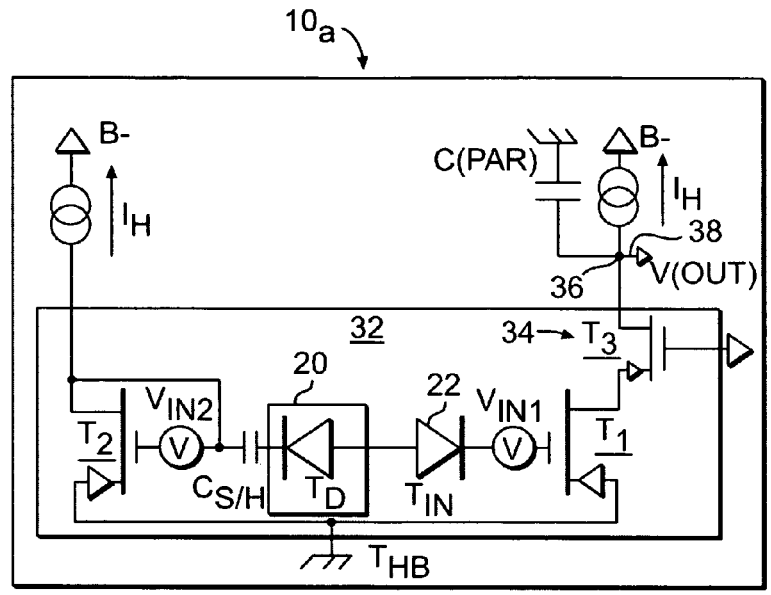
FIG. 6 is an electrical schematic diagram illustrative of the first embodiment of the subject invention.

This relationship between $C_D$ and $C_{IN}$ is readily accomplished by properly scaling the thermocouple diode's parasitic areas. Once the USSS unit cell is laid-out prior to fabrication, the values for $C_P$, $C_{PP}$ and $C_{S/H}$ can be computed and the thermocouple diode's parasitic areas adjusted accordingly. Making all these adjustments, the overall transfer function for the circuit shown in FIG. 6 is:

$$V(OUT) = \left[\frac{\Delta Q_{IN} - \Delta Q_D}{C_{IN}}\right] \quad (42)$$

$$\frac{g_M Z_{OUT}}{1 + \left[\frac{1}{C_{IN}} + \frac{1/C_D + 1/(C_{S/H} + C_{PP})}{1 + C_P/C_D + C_P/(C_{S/H} + C_{PP})}\right](C_{GS} + C_{GD})}$$

Where, $g_M$ and $Z_{OUT}$ are respectively the transconductance of FET $T_1$ and the impedance at the drain of the cascode FET $T_3$. The product of $g_M$ times $Z_{OUT}$ will be adjusted to be greater than 10000 and the bandwidth adjusted in concert with the USSS pixel bandwidth to be less than 100 Hz.

Figure 8:
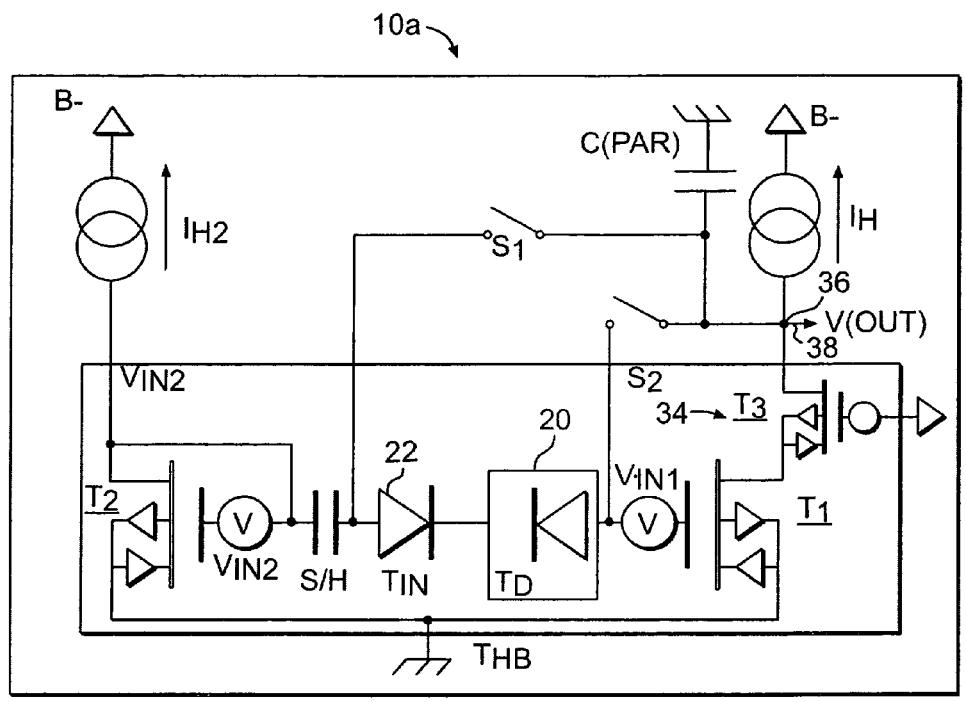
FIG. 8 is an electrical schematic diagram further illustrative of the embodiment shown in FIG. 6 and including a pair of switches for implementing the cancellation of local threshold voltage variations and low frequency 1/f noise components in the readout signal.

The inverting amplifier readout circuit schematic, shown in FIG. 6, does not include provisions for removing the local threshold variations and 1/f noise. Voltages from these sources produce errors that cannot be distinguished from temperature differences between the detector and intermediate stage. Therefore it is very important to cancel local threshold offsets and 1/f noise offset to achieve minimization of thermal loading through the USSS electro-thermal feedback loop and thereby maximize sensitivity. It is desirable that this improvement be done electronically without any mechanical choppers. A circuit with provisions for removing local threshold variations and canceling the low frequency 1/f noise components is shown in FIG. 8. This circuit is symmetrically constructed with two common source MOS transistors $T_1$ and $T_2$ to cancel temperature dependence of the threshold voltage. The two diodes 22 and 20, respectively, monitor the temperature of the intermediate and detector stages 16 and 14. A cascode stage $T_3$ is added to minimize capacitive loading on the gate from the Miller effect. Switches $S_1$ and $S_2$ have been incorporated into the circuit in FIG. 6 for implementing the CNC operation.

FIG. 8 is used to provide a detailed description of how the CNC circuit operates. The cascode MOS transistor $T_3$ eliminates the Miller multiplier of the gate-to-drain capacitance from loading the signal provided by the two temperature sensing diodes 20 and 22 (Equation 42). The rest of the circuit is constructed symmetrically like that of FIG. 6 to remove the MOS threshold offsets and the low frequency 1/f noise. Threshold and low frequency 1/f removal is facilitated with two low noise current generators $I_{H1}$ and $I_{H2}$. The effect of threshold offsets and low frequency 1/f noise is removed by recording these signals on the sample and hold capacitor S/H that removes them. This is illustrated by analyzing the circuit operation of FIG. 8 in conjunction with the switching sequence shown in FIG. 9.

Figure 9:
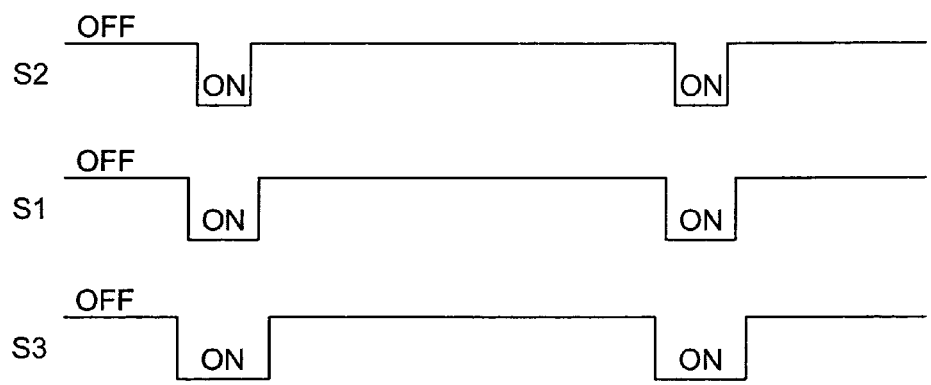
FIG. 9 is a timing diagram illustrative of the switching sequence of a circuit shown in FIG. 8.

Initially, cascade MOSFET $T_3$ is switched on hard to electrically short the output node 36 to the drain and source of the common gate MOS transistor $T_3$ by applying the S3 waveform shown in FIG. 9. Next, switch $S_1$ is turned on and this is followed by turning on switch $S_2$ as also illustrated in FIG. 9. This results in a symmetrical circuit about the sample and hold capacitor S/H. The left plate of the capacitor S/H receives voltage $V_{IN2}$ and the right plate receives voltage $V_{IN1}$. Voltage $V_{IN1}$ includes the MOS threshold voltage $V_{T1}$ and the noise voltage $E_{N1}$. Similarly, voltage $V_{IN2}$ includes the MOS threshold voltage $V_{T2}$ and the noise voltage $E_{N2}$. Accordingly, the two voltages applied across the capacitor S/H can be written as:

$$V_{IN1} = -V_{T1} - E_{N1}(t)$$

$$V_{IN2} = -V_{T2} - E_{N2}(t) \quad (43)$$

The voltages generated on the drain of the MOS transistor $T_2$ results in a voltage $V_{S/H}$ across the S/H capacitor which can be expressed as:

$$V_{S/H}(t) = V_{T2} - V_{T1} + E_{N2}(t) - E_{N1}(t) \quad (44)$$

The switching sequence for the circuit in FIG. 8 is illustrated in FIG. 9 for a single period equal to the frame rate. Three pulses are used for switching and the switching waveforms are nested: S2 is nested inside S1 and S1 is nested inside S3. S3 represents the waveform applied to the cascode MOS $T_3$ to turn it hard so it becomes short. In the OFF position, $T_3$ is biased in a normal ON state so that it behaves as a common gate amplifier.

With the switches $S_1$ and $S_2$ ON, and the voltage given by Equation 44 appears across the capacitor S/H, and a new equilibrium is established inside the circuit of FIG. 8. With switch S1, S2 and S3 ON, the voltage amplifier's gain is disabled and hence the electro-thermal feedback is disabled.

This disabling of the electro-thermal feedback loop greatly reduces (×100) the thermal isolation of the detector stage 14 thereby causing the temperature of detector stage 14 and intermediate stage 16 temperature to converge and decrease towards the temperature of the heat bath stage 18 (FIG. 3). With the detector and intermediate stages 14 and 16 at the same temperature, no voltage is produced across the back-to-back temperature sensing diodes 20 and 22. The gate voltage applied to each MOS transistor $T_1$, $T_2$, and $T_3$ by the respective drains is automatically adjusted to accommodate low noise current $I_H$. Thus, the voltages applied to the MOS gates compensate (or cancel) the internal MOS threshold and noise voltages. The voltage around the loop formed by the two MOS transistors gates $T_1$, and $T_2$, the two diodes 20 and 22, and the S/H capacitor sums to zero.

The voltage across the capacitor S/H at time to is recorded when switches S1 and S2 are opened, and switch S3 waveform enables the cascode stage $T_3$. With these actions, the voltage amplifier $T_1$ is enabled and the electro-thermal feedback loop is made operational. This leads to a new equilibrium between the scene, the detector stage 14, and the intermediate stage 16 (FIG. 3). The temperature of the back-to-back diodes 20 and 22 changes and a voltage signal is produced to drive the voltage amplifier $T_1$ with cascode stage $T_2$. This new differential temperature voltage signal is in series with the recorded voltage across the capacitor S/H and the noise and threshold voltages associated with each MOS transistor $T_1$ and $T_2$. Summing all these voltage terms, the voltage $V_G(t)$ applied to the gate of the voltage amplifier $T_1$ and relative to $T_2$ is given by:

$$V_G(t) = V_{T1} - V_{T2} + E_{N1}(t) - E_{N2}(t) + \delta V_G(t) + V_{S/H}(t_o) \quad (45)$$

$$= E_{N1}(t) - E_{N1}(t_O) - E_{N2}(t_O) + E_{N2}(t_O) + \delta V_{IN}(t)$$

The voltage recorded on the capacitor S/H cancels the local threshold variations. Additionally, noise voltages are recorded on the capacitor S/H and these will modify the noise in the circuit. The noise modification is better recognized in the frequency domain and thus is represented by the expression:

$$V_G(\omega) = E_{N1}(\omega)[1 - e^{-i\omega t_O}] - E_{N2}(\omega)[1 - e^{-i\omega t_O}] + \delta V_{IN}(\omega) \quad (46)$$

The spectral content of the voltage applied to the gate $V_G(\omega)$ of $T_1$ is made up of three terms: two noise terms and a signal term. Each of the noise term is expressed as a difference between the noise value at "t" and "$t_o$". The time dependence of the noise is unknown, but we do know how to represent noise by its power spectral density. Using this representation, the noise contribution to the signal in Equation 46 is readily expressed and is given by:

$$V_G(t) = \delta V_{IN}(t) + \sqrt{\int_{-\infty}^{\infty} |E_{N1}(\omega)|^2 \sin^2\left[\frac{\omega t_O}{2}\right] d\omega + \int_{-\infty}^{\infty} |E_{N2}(\omega)|^2 \sin^2\left[\frac{\omega t_O}{2}\right] d\omega} \quad (47)$$

It is evident from Equation 47 that the voltage amplifier noise is modified by a sine-squared term and this term will suppress the contribution of low frequency 1/f noise and double the power of the white noise. The reduction of the 1/f noise depends on the amplifier bandwidth and the time difference between sampling the noise and reading of the signal, or correlation. The time difference between reading the signal and noise is $t_o/2$. Hence, noise terms with frequencies varying slower than $t_o/2$ will be attenuated. Noise frequencies beyond this will be increased, depending on the amplifier's bandwidth.

Determination of the noise power will now be made. The noise from the USSS electrical readout circuit is affected by CNC and electro-thermal feedback. Equation 46 provides an expression for the effect of the CNC on the noise's spectral amplitude without including any other effects. However, the noise's is also modified by the electro-thermal feedback and the voltage amplifier's frequency response. Both of these effects are incorporated into a model and an analytical expression is obtained that includes these effects. The analysis makes use of superposition of the different frequency components of the noise. We do not know the specific value of the noise amplitude is not known since these are algebraic variables. Once the linear analysis is completed with the noise amplitude, the results are transformed into a power spectral density and integrated to compute the total RMS noise value. The noise power spectral density of the electrical circuits is something that is routinely measured and the calculated analytical results can be numerically evaluated in terms of these experimental measurements.

The effective total spectral noise voltage $V_{NO}(\omega)$ (applied to the MOS gate of the voltage amplifier $T_1$ without including any form of feedback is given by Equation 46 if the signal $\delta V_{IN}(\omega)$ is removed and is defined as:

$$V_{NO}(\omega) = E_{N1}(\omega)[1 - e^{-i\omega t_O}] - E_{N2}(\omega)[1 - e^{-i\omega t_O}] \quad (48)$$

Electro-thermal feedback produces this noise level and the noise voltage is modified to $V_N(\omega)$ from $V_{NO}(\omega)$ and these are related by the expression:

$$V_{NO}(\omega) + \delta E_{IN}(\omega) = V_{NO}(\omega) + \frac{\partial[\Delta\Phi_{IN}(T_{IN})]}{\partial T_{IN}}\delta T_{IN}(\omega) - \quad (49)$$
$$\frac{\partial[\Delta\Phi_D(T_D)]}{\partial T_D}\delta T_D(\omega)$$
$$= V_{NO}(\omega) + \frac{\partial[\Delta\Phi_{IN}(T_{IN})]}{\partial T_{IN}}[\delta T_{IN}(\omega) - \delta T_D(\omega)]$$
$$= V_N(\omega)$$

The expression for $\delta E_{IN}(\omega)$ in Equation 49 was obtained from Equations 14 and 42, 50. Also, the temperature derivative $\partial\Delta\Phi(T)/\partial T$ of the potential difference across the diodes 20 and 22 is the same for the detector and intermediate stages 14 and 16. Thus Equation 49 simply reflects the fact that changing noise voltage on the gate will slightly change the MOS amplifier current and this will cause a slight change in the intermediate stage 16.

A detailed qualitative examination of the circuit shown in FIG. 8 reveals the effects of electro-thermal feedback on the noise voltage amplitude. Specifically, the sequence of events that occurs if the noise amplitude increases at the gate of MOS $T_1'$ as follows:

1. Noise at the gate of MOS $T_1'$ increases.
2. Larger voltage on MOS gate $T_1'$ reduces current flowing in the MOS channel of $T_1'$.
3. The output voltage becomes more negative.
4. With a bigger drop across drain to source of $T_1'$ causes the amplifier's quiescent power to increase thereby heating the intermediate stage.
5. The temperature of the intermediate stage 16 increases slightly.
6. The intermediate stage diode 22 temperature sensor decreases its output voltage.
7. The voltage on MOS gate $T_1'$ decreases slightly to compensate for the increases in noise voltage.

If the noise voltage at the gate of $T_1'$ decreases, then the reverse will occur in the aforementioned steps 1 though 7. What is important to note is that the sequence detailed above shows that electro-thermal feedback reduces the amplitude of the noise voltage. This qualitative explanation is corroborated by the following analysis.

Relating the noise with electro-thermal feedback $[V_N(\omega)]$ to the noise without feedback electro-thermal feedback $[V_{NO}(\omega)]$ requires evaluating Equation 49 and specifically requires computation of $\delta T_{IN}$ and $\delta T_D$, since $\partial\Delta\Phi(T)/\partial T$ is known from Equation 42. The relationship between $\delta T_{IN}$ and $\delta T_D$ is readily obtained from Equations 4. Using superposition, the change in temperature of the intermediate stage in terms of changes in the temperature of the detector stage is given by Equation 4 when $\delta T_S$ is zero. After doing the algebra, the following expression is obtained:

$$\delta T_D = \frac{[G_2]}{[G_{D1} + G_2 + j\omega C_D]}\delta T_{IN} \quad (50)$$

Change in quiescent heat delivered induced by the gate noise voltage $T_1'$ is given as $\delta Q_H = I_H Z_O V_N(\omega)g_M$, where $Z_O$ is the output impedance of the MOS/cascode voltage amplifier and $g_M$ is the transconductance of this amplifier. Substituting this for $\delta Q_H$ in Equation 5, and after some rearrangement an expression is obtained which can be expressed as:

$$-[G_{D2}+G_2+G_3+j\omega C_{IN}]\delta T_{IN}+G_2\delta T_D+I_H Z_O V_N(\omega)g_M=0 \quad (51)$$

Changes in the temperature of the intermediate stage 16 is readily computed in terms of the noise voltage by substituting Equation 50 into Equation 51, and solving for $\delta T_{IN}$, obtained is:

$$\delta T_{IN}(\omega) = \quad (52)$$
$$\frac{I_H Z_O V_N(\omega)g_M[G_{D1} + G_2 + j\omega C_D]}{G_2(G_{D1} + j\omega C_D) + (G_{D2} + G_3 + j\omega C_{IN})(G_{D1} + G_2 + j\omega C_D)}$$

Substituting Equation 50 for $\delta T_D$ in Equation 49 and replacing $\delta T_{IN}$ with Equation 52 a resulting expression for the resulting MOS gate noise voltage modified by electro-thermal feedback in terms of the initial noise voltage without feedback is given by:

$$V_N(\omega) = \quad (53)$$
$$\frac{V_{NO}(\omega)}{\left[1 + \frac{-I_H Z_O g_M \frac{\partial[\Delta\Phi_{IN}(\omega)]}{\partial T_{IN}}[G_{D1} + j\omega C_D]}{G_2(G_{D1} + j\omega C_D) + (G_{D2} + G_3 + j\omega C_{IN})(G_{D1} + G_2 + j\omega C_D)}\right]}$$

Electro-thermal feedback decreased the noise amplitude and this is evident from the denominator of Equation 53, which is greater than one. The noise reduction depends on the size of the magnitude of the algebraic expression in the denominator. However, it is evident that the better the thermal isolation is of the detector stage 14 from the intermediate stage 16, and the intermediate stage 16 from the heat bath 18, the lower will be the noise from the readout circuit.

Therefore, designing a USSS based bolometer requires care to be taken so as to minimize $G_2$, and $G_3$ so that maximum performance can be achieved.

Incorporating Equation 53 into Equation 47 yields an expression for the noise and signal applied to the USSS MOS readout amplifier with electro-thermal feedback effects included and can be expressed as:

$$V_G(t) = \delta V_{IN}(t) + \sqrt{\int_{-\infty}^{\infty}|V_N(\omega)|^2 \sin^2\left[\frac{\omega t_O}{2}\right]d\omega} \quad (54)$$

As mentioned previously, the CNC suppresses the low frequency 1/f noise components since the sine squared term inside the integral of Equation 54 provides an "$\omega^2$" term that cancels the divergence from the 1/f noise. The output noise voltage from the voltage amplifier $T_1$" depends on the transconductance and the output impedance and becomes:

$$V_O(t) = g_M Z_O \left[ \delta V_{IN}(t) + \sqrt{\int_{-\infty}^{\infty} |V_N(\omega)|^2 \sin^2\left[\frac{\omega t_O}{2}\right] d\omega} \right] \quad (55)$$

The evaluation of the integral inside the square brackets requires use of exponential integrals and these have been tabulated but are not shown for sake of brevity.

Instead of using inverting amplifiers as illustrated in FIGS. 6 and 8 for a pixel $10_a$, a USSS pixel $10_b$ can be also implemented with non-inverting amplifiers. Such an embodiment and analysis is presented next.

Figure 10:
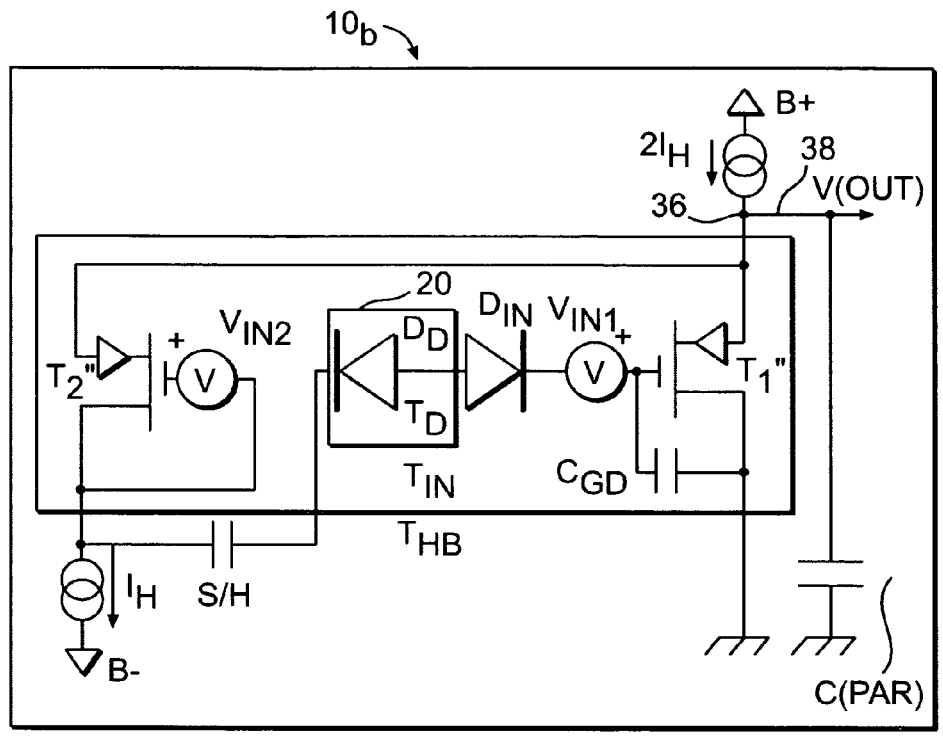
FIG. 10 is an electrical schematic diagram illustrative of a second embodiment of the subject invention.

An electro-thermal feedback amplifier with the threshold and 1/f noise cancellation elements is shown in FIG. 10. This circuit includes a non-inverting voltage amplifier, two temperature sensors 20 and 22. The non-inverting voltage amplifier includes FET transistors $T_1$" and $T_2$" to achieve a high input impedance circuit for reading the two diode temperature sensors. The detector stage's 14 temperature sensor is diode 20 and the intermediate stage's 16 temperature sensor is a second diode 22. The temperature dependent threshold voltage of the FET $T_1$" is cancelled with FET $T_2$". Both temperature sensing diodes 20 and 22 and the FETs $T_1$" and $T_2$" have the same temperature characteristics. This is important for the operation of the electro-thermal feedback loop. The effectiveness of the electro-thermal feedback loop depends on the amplifier's voltage gain made from FET $T_1$". Specifically, the amplifier's output voltage V(OUT) depends on the voltage gain and the voltage difference stemming from the temperature difference between the two back-to-back diode thermocouples 20 and 22.

Figure 11:
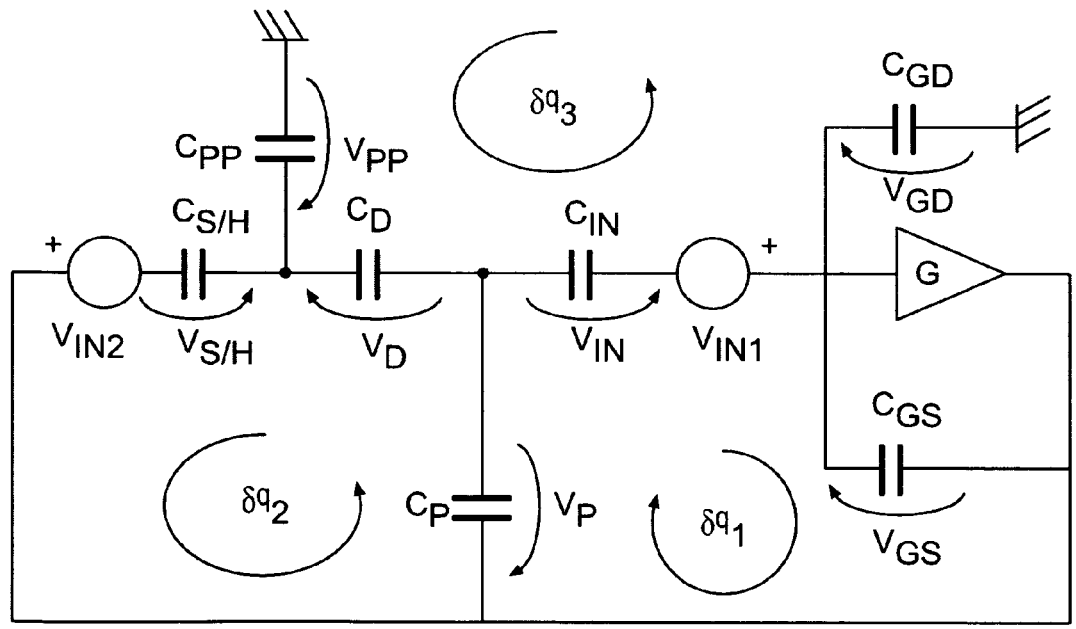
FIG. 11 is an electrical equivalent circuit diagram of the embodiment shown in FIG. 10.

A physical layout is needed to provide circuit realism for analyzing the output voltage V(OUT) and this is achieved with the aid of an equivalent circuit that includes relevant parasitics. FIG. 11 is an equivalent circuit for circuit in FIG. 10 with parasitic capacitances included. The worst case affects of parasitic capacitances are at high frequencies. The analysis includes these even though the circuit operates at very low frequencies where conventionally parasitic capacitances do not matter. However, because the diode thermocouples 20 and 22 have high impedances, they are treated as charged capacitors $C_D$ and $C_{IN}$ biased with voltages dependent on temperature. With sufficiently large time constants, parasitic capacitances do matter.

As before in the case of FIG. 8, the FET non-inverting electro-thermal feedback circuit, illustrated in FIG. 10, incorporates provisions for temperature sensing and electro-thermal feedback to equalize the temperatures of the intermediate stage 16 with the temperature of the detector stage 14.

The analysis of FIG. 10 provides the output voltage V(OUT) as a function of changes in the voltage across the detector's and intermediate's stages diode thermocouples 20 and 22. The total signal from the two diode thermocouples is calculated using superposition to solve for the V(OUT) in terms of the voltage across the detector and intermediate diode thermocouples. Analysis shows the significance of parasitic capacitances. Proper operation of the electro-thermal feedback loop requires the transfer function for the detector and intermediate stage temperature sensing diodes 20 and 22 other than signs to be the same. Deriving the output voltage produced by the detector's stage diode thermocouple 20 is computed first.

The equivalent circuit of the circuit diagram of FIG. 10 is shown in FIG. 11. The equivalent circuit of FIG. 11 depicts FET $T_1$" as an amplifier with voltage gain G, where G approaches unity. The output impedance of FET $T_1$" is much lower than any of the capacitive elements and is approximated as zero. The threshold voltage of FET $T_1$" is represented as $V_{IN1}$. Similarly, the impedance of FET $T_2$" is also very small and it is represented as a voltage generator corresponding to the threshold voltage of $T_2$", i.e., $V_{IN2}$. There are several parasitic capacitances and these are included in the analysis. Capacitance $C_P$ is the parasitic capacitance from the intermediate stage temperature sensing diode 22 to the N+ backside contact. Capacitance $C_{PP}$ is the parasitic capacitance from the detector stage temperature sensing diode 20 to the substrate. Capacitance $C_{GD}$ is the parasitic capacitance between the gate of FET $T_1$" and its the drain. Capacitance $C_{GS}$ is the parasitic capacitance between the gate of FET $T_1$" and the source. The analysis of this circuit is performed using capacitors as shown in FIG. 11 because the two zero current bias temperature sensing diodes 20 and 22 are best represented by capacitors $C_D$ and $C_{IN}$ with a charge across that changes with temperature. For the purpose of clarity, the analysis begins without including CNC switches.

Three-charge currents $\delta q_1$, $\delta q_2$, and $\delta q_3$, are produced by temperature changes in the of the two sensing diode thermocouples 20 and 22, now represented by capacitors $C_D$ and $C_{IN}$. Mesh equations for each one of these three charge currents $\delta q_1$, $\delta q_2$, and $\delta q_3$ are expressed as:

$$V_{IN1} - V_{GS} - V_P + V_{IN} = 0 \quad (56)$$

$$V_{IN2} + V_D - V_P - V_{S/H} = 0 \quad (57)$$

$$V_{IN1} - V_D + V_{IN} + V_{PP} - V_G = 0 \quad (58)$$

Under equilibrium, the voltages across capacitors $C_D$ and $C_{IN}$ are represented as a ratio of the charge divided by its capacitance. Making these substitutions, Equation 56, 57 and 58 are rewritten to yield:

$$V_{IN1} - V_{GS} - \frac{Q_P}{C_P} + \frac{Q_{IN}}{C_{IN}} = 0 \quad (59)$$

$$V_{IN2} + \frac{Q_D}{C_D} - \frac{Q_P}{C_P} - \frac{Q_{S/H}}{C_{S/H}} = 0 \quad (60)$$

$$V_{IN1} - \frac{Q_D}{C_D} + \frac{Q_{IN}}{C_{IN}} + \frac{Q_{PP}}{C_{PP}} - V_G = 0 \quad (61)$$

Equations 59 through 61 represent FIG. 11 after equilibrium is reestablished from an arbitrary set of initial conditions. The effect of temperature changes in the detector stage 14, and the intermediate stage 16, are analyzed next.

Temperature changes in the detector stage's 14 will change the charge on the detector temperature sensing diode 20 by $\Delta Q_D$. This will unbalance the voltages around the closed loops illustrated in FIG. 11 and cause charge currents $\delta q_1$, $\delta q_2$, and $\delta q_3$ to flow so that a new equilibrium is established. Rewriting Equations 59 through 61 the new equilibrium conditions are obtained and these are given by:

$$V_{IN1} - V_{GS} - \delta V_{GS} - \frac{(Q_P + \delta q_1 + \delta q_2)}{C_P} + \frac{(Q_{IN} - \delta q_1 - \delta q_3)}{C_{IN}} = 0 \quad (62)$$

$$-\delta V_{GS} - \frac{(\delta q_1 + \delta q_2)}{C_P} - \frac{(\delta q_1 + \delta q_3)}{C_{IN}} = 0$$

$$V_{IN2} + \frac{(Q_D + \Delta Q_D - \delta q_2 + \delta q_3)}{C_D} - \quad (63)$$

$$\frac{(Q_P + \delta q_1 + \delta q_2)}{C_P} - \frac{(Q_{S/H} + \delta q_2)}{C_{S/H}} = 0$$

$$\frac{(\Delta Q_D - \delta q_2 + \delta q_3)}{C_D} - \frac{(\delta q_1 + \delta q_2)}{C_P} - \frac{\delta q_2}{C_{S/H}} = 0$$

$$V_{IN1} - \frac{(Q_D + \Delta Q_D - \delta q_2 + \delta q_3)}{C_D} + \quad (64)$$

$$\frac{(Q_{IN} - \delta q_3 - \delta q_1)}{C_{IN}} + \frac{(Q_{PP} - \delta q_3)}{C_{PP}} - V_G - \delta V_G = 0$$

$$-\frac{(\Delta Q_D - \delta q_2 + \delta q_3)}{C_D} - \frac{(\delta q_3 + \delta q_1)}{C_{IN}} - \frac{\delta q_3}{C_{PP}} - \delta V_G = 0$$

The second line in each equation has been obtained by using Equations 59 through 61 to remove the terms in each equation that sum up to zero. An expression for changes in the output voltage V(OUT) in response to a change of $\Delta Q_D$ is obtained in terms of currents $\delta q_1$, $\delta q_2$, and $\delta q_3$. The output voltage V(OUT) given in terms of changes currents $\delta q_1$, $\delta q_2$, and $\delta q_3$ is given by:

$$\delta V_{GS} = \delta V_G - G\delta V_G = \frac{(\delta q_1 + \delta q_3)(1-G)}{C_{GD} + (1-G)C_{GS}} \quad (65)$$

Utilizing Equation 65 we eliminate the variables $\delta V_G$, and $\delta V_{GS}$ in Equations 62, and 64, to obtain a solution for $\delta q_1$, and $\delta q_3$ in terms of $\Delta Q_D$ and the equivalent circuit parameters and parasitic capacitances shown in FIG. 11. Replacing variables $\delta V_G$, and $\delta V_{GS}$ in Equations 62, and 64 with Equation 65 and grouping terms a new set of equations are obtained which are given by:

$$\left[\frac{(1-G)}{C_{GD} + (1-G)C_{GS}} + \frac{1}{C_P} + \frac{1}{C_{IN}}\right]\delta \quad (62a)$$

$$q_1 + \left[\frac{1}{C_P}\right]\delta q_2 + \left[\frac{(1-G)}{C_{GD} + (1-G)C_{GS}} + \frac{1}{C_{IN}}\right]\delta q_3 = 0$$

$$\left[\frac{1}{C_P}\right]\delta q_1 + \left[\frac{1}{C_D} + \frac{1}{C_P} + \frac{1}{C_{S/H}}\right]\delta q_2 - \left[\frac{1}{C_D}\right]\delta q_3 = \quad (63a)$$

$$\frac{\Delta Q_D}{C_D} - \left[\frac{1}{C_{IN}} + \frac{1}{C_{GD} + (1-G)C_{GS}}\right]\delta q_1 + \left[\frac{1}{C_D}\right]$$

$$\delta q_2 - \left[\frac{1}{C_D} + \frac{1}{C_{IN}} + \frac{1}{C_{PP}} + \frac{1}{C_{GD} + (1-G)C_{GS}}\right]\delta q_3 = \frac{\Delta Q_D}{C_D}$$

Solving for $\delta q_1$, and $\delta q_3$ requires first replacing $\delta q_2$ in Equations 63a and 64a using Equation 62a. Once Equations 63a and 64a have eliminated the variable $\delta q_2$, $\delta q_1$, and $\delta q_3$ can be solved in terms of $\Delta Q_D$. Inserting these terms into Equation 65, an expression for V(OUT) in terms of $\Delta Q_D$ is obtained. Rewriting Equation 62 to solve for $\delta q_2$ in terms of $\delta q_1$, and $\delta q_3$, obtained is:

$$\delta q_2 = -\left[\frac{(1-G)C_P}{C_{GD} + (1-G)C_{GS}} + \frac{C_P}{C_{IN}} + 1\right] \quad (62b)$$

$$\delta q_1 - \left[\frac{(1-G)C_P}{C_{GD} + (1-G)C_{GS}} + \frac{C_P}{C_{IN}}\right]\delta q_3$$

Substituting 62b into 63a, a new Equation after some regrouping of terms is obtained, and it is given by:

$$\left[\left(\frac{1}{C_D} + \frac{1}{C_P} + \frac{1}{C_{S/H}}\right)\left(\frac{C_P(1-G)}{C_{GD} + (1-G)C_{GS}} + \frac{C_P}{C_{IN}}\right) + \frac{1}{C_D} + \frac{1}{C_{S/H}}\right]\delta \quad (66)$$

$$q_1 + \left[\left(\frac{1}{C_D} + \frac{1}{C_P} + \frac{1}{C_{S/H}}\right)\left(\frac{C_P(1-G)}{C_{GD} + (1-G)C_{GS}} + \frac{C_P}{C_{IN}}\right) + \frac{1}{C_D}\right]$$

$$\delta q_3 = -\frac{\Delta Q_D}{C_D}$$

Substituting 62b into 64a, a second equation after some regrouping is obtained and it is given by:

$$\left[\left(\frac{1}{C_{GD} + (1-G)C_{GS}} + \frac{1}{C_{IN}} + \quad (67)\right.\right.$$

$$\frac{1}{C_{PP}} + \left(\frac{C_P(1-G)}{C_{GD} + (1-G)C_{GS}} + \frac{C_P}{C_{IN}}\right)\frac{1}{C_D}\right]$$

$$\delta q_1 + \left[\frac{1}{C_{GD} + (1-G)C_{GS}} + \frac{1}{C_{IN}} + \frac{1}{C_D} + \frac{1}{C_{PP}} + \right.$$

$$\left.\left(\frac{C_P(1-G)}{C_{GD} + (1-G)C_{GS}} + \frac{C_P}{C_{IN}}\right)\frac{1}{C_D}\right]\delta q_3 = -\frac{\Delta Q_D}{C_D}$$

Combining Equations 66 and 67 with Equation 65 a simplified expression for V(OUT) in terms of $\Delta Q_D$ is obtained if one recognizes that $C_D \ll C_{S/H}$.

Using Equation 65 in conjunction with Equation 66 an expression for V(OUT)=$\delta V_S$=$G\delta V_G$ is obtained and it is given by:

$$\delta V_S = \quad (68)$$

$$-\left(\frac{\Delta Q_D}{C_D}\right)\frac{G}{\left[\left(\frac{1}{C_D} + \frac{1}{C_P} + \frac{1}{C_{S/H}}\right)\left(\frac{(1-G)C_P}{C_{GD} + (1-G)C_{GS}} + \frac{C_P}{C_{IN}}\right) + \frac{1}{C_P}\right]}$$

$$[C_{GD} + (1-G)C_{GS}]$$

The structure of Equation 68 includes a leading factor that is equal to the detector stage 14 thermocouple voltage times several numerical terms. Evaluating these, the relative value of the terms is next utilized in Equation 68. By design, it can be seen that $C_{GS} \cong C_{GD}$, $C_{S/H} \gg \{C_D, C_{IN}\}$, and $C_D \cong C_G$, $G \cong 1$, and $C_P \gg C_{IN}$. Including these in Equation 68, a simplified expression for V(OUT)=$\delta V_S$=$G\delta V_G$ is obtained and it is given by:

$$\delta V_S \cong -\left(\frac{\Delta Q_D}{C_D}\right)\left(\frac{C_D}{2C_{GD}}\right) \quad (69)$$

This expression illustrates that the gain of the non-inverting voltage amplifier for signals applied to the FET's $T_1''$ gate can be approximated as the ratio between the detector thermocouple diode 20 capacitance $C_D$ divided by twice the FET's parasitic gate to drain capacitance $C_{GD}$. The estimated value of $C_{GD} \cong 0.5$ fF and this will limit the gain of the amplifier to about 90. To achieve larger gain, the value of $C_{GD} \cong 0.5$ fF needs to be reduced or additional gain stages must be inserted.

Now computing the output voltage signal V(OUT) $=\delta V_s = G \delta V_G$ due to changes in the intermediate stage diode thermocouple voltage the same equivalent circuit given in FIG. 11 is used. However, instead of assuming a change in the detector stage diode thermocouple, it is assumed that the intermediate stage thermocouple 22 has experienced a temperature change resulting in a charge change of $\Delta Q_{IN}$. Writing the equations was done for the detector stage (see Equation 56 through 61) and after some simplifications, the following expressions result:

$$-\delta V_{GS} - \frac{(\delta q_1 + \delta q_2)}{C_P} + \frac{(\Delta Q_{IN} - \delta q_1 - \delta q_3)}{C_{IN}} = 0 \tag{70}$$

$$\frac{-\delta q_2 + \delta q_3}{C_D} - \frac{\delta q_1 + \delta q_2}{C_P} - \frac{\delta q_2}{C_{S/H}} = 0 \tag{71}$$

$$\frac{\delta q_2 - \delta q_3}{C_D} + \frac{(\Delta Q_{IN} - \delta q_3 - \delta q_1)}{C_{IN}} - \frac{\delta q_3}{C_{PP}} - \delta V_G = 0 \tag{72}$$

Equation 70 corresponds to Equation 62, Equation 71 corresponds to Equation 63 and Equation 72 corresponds to Equation 64. Utilizing Equation 65, the $\delta V_G$ and $\delta V_{GS}$ terms can be eliminated and after some rearrangements and grouping of terms one obtains:

$$\left[\frac{1-G}{C_{GD} + (1-G)C_{GS}} + \frac{1}{C_P} + \frac{1}{C_{IN}}\right] \delta q_1 + \tag{70a}$$

$$\frac{\delta q_2}{C_P} + \left[\frac{1-G}{C_{GD} + (1-G)C_{GS}} + \frac{1}{C_{IN}}\right] \delta q_3 = \frac{\Delta Q_{IN}}{C_{IN}}$$

$$\frac{\delta q_1}{C_P} + \left[\frac{1}{C_D} + \frac{1}{C_P} + \frac{1}{C_{S/H}}\right] \delta q_2 - \frac{\delta q_3}{C_D} = 0 \tag{71a}$$

$$\left[\frac{1}{C_{GD} + (1-G)C_{GS}} + \frac{1}{C_{IN}}\right] \delta q_1 - \tag{72a}$$

$$\frac{\delta q_2}{C_D} + \left[\frac{1}{C_{GD} + (1-G)C_{GS}} + \frac{1}{C_D} + \frac{1}{C_{PP}} + \frac{1}{C_{IN}}\right] \delta q_3 = \frac{\Delta Q_{IN}}{C_{IN}}$$

The variable $\delta q_2$ is eliminated in Equations 70a and 72a by using Equation 71a. Solving Equation 71a for $\delta q_2$ in terms of variables $\delta q_1$ and $\delta q_3$, and using this expression to eliminate $\delta q_2$ in Equations 70a and 72a, after some rearrangements, two Equations for 70a and 72a are obtained and these are:

$$\left[\frac{(1-G)}{C_{GD} + (1-G)C_{GS}} + \frac{1}{C_{IN}} + \frac{1/C_D + 1/C_{S/H}}{1 + C_P/C_D + C_P/C_{S/H}}\right] \delta q_1 + \tag{70b}$$

$$\left[\frac{(1-G)}{C_{GD} + (1-G)C_{GS}} + \frac{1}{C_{IN}} + \frac{1/C_D}{1 + C_P/C_{IN} + C_P/C_{S/H}}\right] \delta q_3 = \frac{\Delta Q_{IN}}{C_{IN}}$$

$$\left[\frac{1}{C_{GD} + (1-G)C_{GS}} + \frac{1}{C_{IN}} + \frac{1/C_P}{1 + C_D/C_P + C_D/C_{S/H}}\right] \delta q_1 + \tag{72b}$$

$$\left[\frac{1}{C_{GD} + (1-G)C_{GS}} + \frac{1}{C_D} + \frac{1}{C_{PP}} + \frac{1}{C_{IN}} + \right.$$

$$\left.\frac{1/C_D}{1 + C_D/C_P + C_D/C_{S/H}}\right] \delta q_3 = \frac{\Delta Q_{IN}}{C_{IN}}$$

Examining Equations 70b and 72b, and comparing these to Equations 66 and 67, respectively, similarities are noted. In the limit where $\{C_{PP}, C_P\} << \{C_D, C_{IN}\} << C_{S/H}$, and $\{C_{GD}, C_{GS}\} << \{C_D \cong C_{IN}\}$, the two equations pairs become identical, except for a sign. The difference in sign results because the thermocouple temperature sensing diodes 20 and 22 are back to back to provide a voltage signal representing the temperature difference between the detector and intermediate stages 14 and 16. Thus the output signal from the non-inverting voltage amplifier made from FET $T_1''$ and $T_2''$ will be a function of the temperature difference between the two thermocouple diodes 20 and 22 and will be amplified according to the expression:

$$\delta V_S \cong \left(\frac{C_D}{2C_{GD}}\right)\left(\frac{\Delta Q_{IN}}{C_{IN}} - \frac{\Delta Q_D}{C_D}\right) \tag{73}$$

The gain represented by the leading factor of Equation 73 is limited by the parasitic gate to drain capacitance of FET $T_1''$. The voltage gain will be about 100. This may be sufficient for LWIR USSS cameras but not for MM and THz USSS cameras.

The USSS readout circuit shown in FIGS. 10 and 11 do not include provisions for removing the local threshold variations and 1/f noise. Voltage offsets from these sources produce errors that cannot be distinguished from temperature differences between the detector and intermediate stage 14 and 16. Therefore, it is very important to cancel local threshold offsets and low frequency 1/f noise components to minimize thermal loading through the USSS electro-thermal feedback loop and thereby maximize sensitivity.

This improvement needs to be done electronically without any mechanical choppers. A circuit with the provisions for removing the local threshold variations and canceling the low frequency 1/f noise components is shown in FIG. 12.

Figure 12:
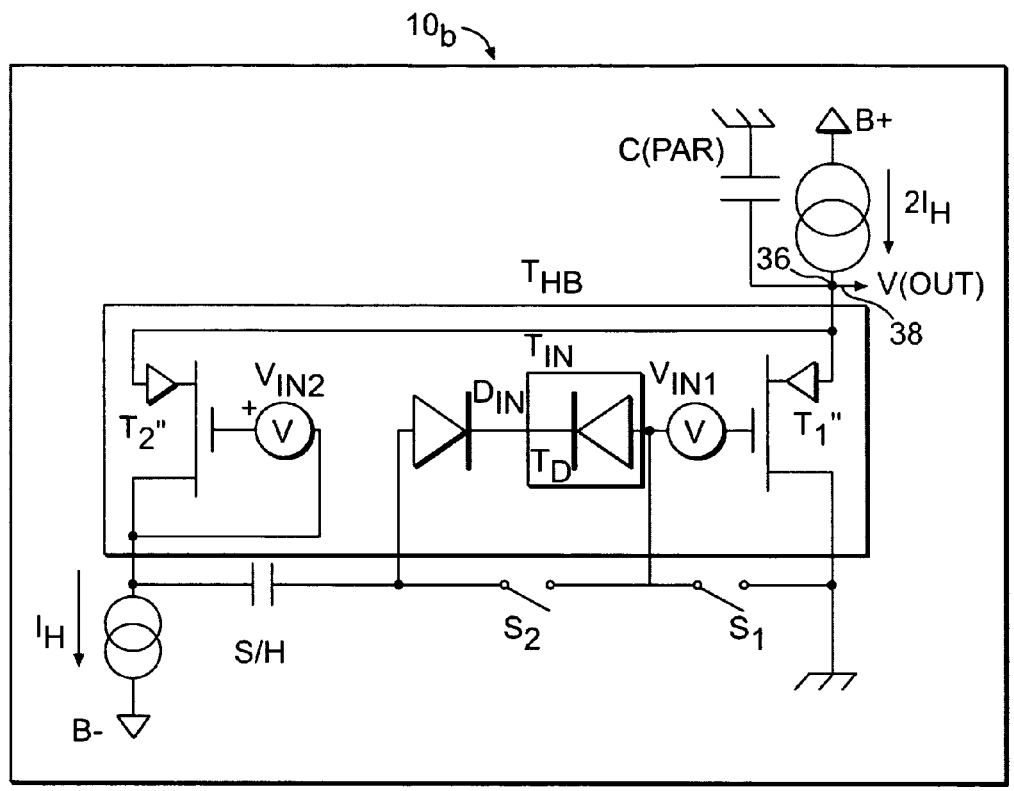
FIG. 12 is an electrical schematic diagram illustrative of FIG. 10 and including a pair of switches for implementing the cancellation of local threshold voltage variations and low frequency 1/f noise components.

Referring now to FIG. 12, the circuit is symmetrically constructed with two common source FET transistors $T_1''$ and $T_2''$ to cancel temperature dependence of the threshold voltage. As before, the two diodes 20 and 22 monitor the temperature of the intermediate and detector stages 14 and 16.

The circuit of FIG. 12 is also constructed symmetrically to remove the threshold offsets, mobility variations with temperature, and the low frequency 1/f noise. Threshold and low frequency 1/f removal is facilitated with two low noise current generators $I_H$ and $2I_H$. The effect of threshold offsets and low frequency 1/f noise is removed by recording these on the sample and hold capacitor S/H that removes them.

Figure 13:
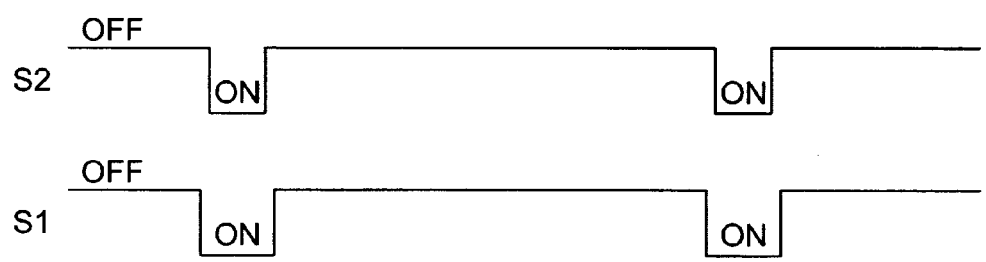
FIG. 13 is a timing diagram illustrative of the switching sequence of the embodiment shown in FIG. 12.

This is mathematically illustrated by analyzing the circuit operation in conjunction with the switching sequence shown in FIG. 13. It begins by disabling the "AC" coupled input of the antenna 30 (FIG. 3) to the detector stage 14 and this is achieved by an electronic switch, not shown. Next, switch $S_1$ is turned ON and this is followed by turning ON switch $S_2$ as illustrated in FIG. 13. Switch $S_1$, however, is optional and may be entirely left out of the circuit when desired. Closing these switches forms a symmetric circuit about the capacitor S/H. The left plate of the capacitor S/H receives voltage $V_{IN2}(t)$ and the right plate receives voltage $V_{IN1}(t)$. Voltage $V_{IN1}(t)$ include the FET threshold voltage $V_{T1}$ and the noise voltages $E_{N1}(t)$. Similarly, voltage $E_{N2}(t)$ includes the FET threshold voltage $V_{T2}$ and the noise voltages $E_{N2}(t)$. Thus, the two voltages applied across the plates of capacitor S/H are expressed as:

$$V_{IN1} = V_{T1} - E_{N1}(t)$$

$$V_{IN2} = V_{T2} - E_{N2}(t) \quad (74)$$

With respect to FIG. 12, the circuit shown in FIG. 10 has electronic switches $S_1$ and $S_2$ incorporated for implementing the cancellation of local threshold voltage variations and low frequency 1/f noise components. Operation of this circuit with switches has been explained heretofore.

A negative voltage is required to turn them ON. The sign in front of noise voltages $E_{N1}(t)$ and $E_{N2}(t)$ does not matter since these variable can be adjusted to account for the sign. The voltages generated on the drains of the two FET transistors $T_1"$ and $T_2"$ result in a voltage $V_{S/H}$ across the sample and hold capacitor S/H that can be expressed as:

$$V_{S/H}(t) = V_{T1} - V_{T2} + E_{N2}(t) - E_{N1}(t) \quad (75)$$

With the switches $S_1$ and $S_2$ ON, and given the voltage given by Equation 75 across the capacitor, a new equilibrium is established inside the circuit shown in FIG. 12. With switch $S_1$, and $S_2$ ON, the voltage amplifier's gain is disabled and hence the electro-thermal feedback is disabled. Additionally, a separate switch can be used to disable the antenna input to the detector stage. The combination of disabling the electro-thermal feedback loop and the antenna input greatly reduces (×100) the detector stage's thermal isolation and signal causing the temperature of the detector and intermediate stages 14 and 16 converge and decrease towards the temperature of the heat bath 18. With the detector and intermediate stages 14 and 16 at the same temperature, no voltage is produced across the back-to-back temperature sensing diodes 20 and 22. The gate voltage applied to each FET transistor $T_1"$ and $T_2"$ by the respective drains is automatically adjusted to accommodate low noise current in $I_H$, and $2I_H$. Thus, the voltages applied to the FET gates compensate or cancel the internal FET threshold and noise voltages. The voltage around the loop formed by the gate of the two FET transistors $T_1"$ and $T_2"$, the two diodes 20 and 22 and the capacitor S/H sums to zero.

Referring now to FIG. 13, the switching sequence of the circuit in FIG. 12 is illustrated for a single period equal to the frame rate. Two pulses are used for switching switches $S_1$ and $S_2$ and the switching waveforms are nested: $S_2$ is nested inside $S_1$. The antenna 30 (FIG. 3) is disabled when switch $S_1$ is turned ON and enabled when switch $S_1$ is turned OFF The voltage across the capacitor S/H at time $t_0$ is recorded when switches $S_1$ and $S_2$ are opened and the antenna is enabled.

With these actions, the non-inverting voltage amplifier with the input at FET $T_1"$ is enabled and the electro-thermal feedback loop is made operational. This leads to a new equilibrium between the scene, the detector stage 14, and the intermediate stage 16. The temperature of the back-to-back diodes 20 and 22 changes and a voltage signal is produced to drive the voltage amplifier. This new voltage signal is in series with the recorded voltage across the capacitor S/H and the noise and threshold voltages associated with each FET transistor $T_1"$ and $T_2'$. Summing all these voltage terms, the voltage $V_G(t)$ applied to the gate of the FET voltage amplifier is given by, $$V_G(t) = V_{T2} - V_{T1} + E_{N1}(t) - E_{N2}(t) + \delta V_G(t) + V_{S/H}(t_o) \quad (76)$$

$$= E_{N1}(t) - E_{N1}(t_O) - E_{N2}(t_O) + E_{N2}(t_O) + \delta V_{IN}(t)$$

The voltage recorded on the capacitor S/H cancels the local threshold variations. Additionally, noise voltages are recorded on the capacitor S/H and these will modify the noise in the circuit. The noise modification is better recognized in the frequency domain which is represented by:

$$V_G(\omega) = E_{N1}(\omega)[1 - e^{-i\omega t_O}] - E_{N2}(\omega)[1 - e^{-i\omega t_O}] + \delta V_{IN}(\omega) \quad (77)$$

The spectral content of the voltage applied to the gate $V_G(\omega)$ is made up of three terms, namely: two noise terms and a signal term. Each of the noise term is expressed as a difference between the noise value at "t" and "$t_o$". The time dependence of the noise is unknown; however, it can be represented by its power spectral density. Using this representation, the noise contribution to the signal in Equation 77 can readily be expressed as:

$$V_G(t) = \delta V_{IN}(t) + \sqrt{\int_{-\infty}^{\infty} |E_{N1}(\omega)|^2 \sin^2\left[\frac{\omega t_O}{2}\right] d\omega + \int_{-\infty}^{\infty} |E_{N2}(\omega)|^2 \sin^2\left[\frac{\omega t_O}{2}\right] d\omega} \quad (78)$$

It is again evident from Equation 78 that the voltage amplifier noise is modified by a sine-squared term and this term will suppress the contribution of low frequency 1/f noise and double the power of the white noise. The reduction of the 1/f noise depends on the amplifier bandwidth and the time difference between sampling the noise and reading of the signal, or correlation. The time difference between reading the signal and noise is $t_o/2$. Hence, noise terms with frequencies varying slower than $t_o/2$ will be attenuated. Noise frequencies beyond this will be increased, depending on the amplifiers bandwidth.

The noise from the USSS electrical readout circuit is affected by CNC and electro-thermal feedback. Equation 77 provides an expression for the effect of the CNC on the noise's spectral amplitude without including any other effects. However, the noise is also modified by the electro-thermal feedback and the voltage amplifier's frequency response. Both of these effects are incorporated into a model and an analytical expression is obtained that includes these effects. The analysis makes use of superposition of the different frequency components of the noise. The specific values of the noise amplitude are not therefore these values and are treated as algebraic variables. Once the linear analysis is completed with the noise amplitude, the results are transformed into a power spectral density and integrated to compute the total RMS noise value. The noise power spectral density of the electrical circuits is something that is routinely measured and the calculated analytical results can thus be numerically evaluated in terms of the experimentally measured noise power spectral density.

The effective total spectral noise voltage $V_{NO}(\omega)$, applied to the FET gate of the non-inverting voltage amplifier, without including any form of feedback, is given by Equation 77 {with the signal $\delta V_{IN}(\omega)$ removed) and is defined as, $$V_{NO}(\omega) = E_{N1}(\omega)[1 - e^{-i\omega t_O}] - E_{N2}(\omega)[1 - e^{-i\omega t_O}] \quad (79)$$

Electro-thermal feedback effects this noise level and the noise voltage is modified to $V_N(\omega)$ from $V_{NO}(\omega)$ and these are related by the expression:

$$V_{NO}(\omega) + \delta E_{IN}(\omega) = V_{NO}(\omega) + \frac{\partial[\Delta\Phi_{IN}(T_{IN})]}{\partial T_{IN}}\delta T_{IN}(\omega) - \frac{\partial[\Delta\Phi_D(T_D)]}{\partial T_D}\delta T_D(\omega) \qquad (80)$$
$$= V_{NO}(\omega) + \frac{\partial[\Delta\Phi_{IN}(T_{IN})]}{\partial T_{IN}}[\delta T_{IN}(\omega) - \delta T_D(\omega)]$$
$$= V_N(\omega)$$

The expression for $\delta E_{IN}(\omega)$ in Equation 80 was obtained from Equations 14 and 50. Also, the temperature derivative $\partial\Delta\Phi(T)/\partial T$ of the potential difference across the temperature sensing diodes is the same for the detector and intermediate stages 14 and 16. Thus, Equation 80 simply reflects the fact that changing noise voltage on FET gate $T_1''$ will slightly change the FET amplifier current and this will cause a slight change in the temperature of the intermediate stage 16. A detailed qualitative examination of the circuit in FIG. I-12 reveals the effects of electro-thermal feedback on the noise voltage amplitude. Specifically, the sequence of events that occurs if the noise amplitude increases at the FET gate $T_1''$ is as follows:

1. Noise at FET gate $T_1''$ gate increases.
2. Larger voltage on the gate reduces current flowing in the channel of FET $T_1''$.
3. The output voltage V(out) becomes more negative.
4. With a bigger drop across the Drain source of FET $T_1''$ the amplifiers quiescent power increases and heats up the intermediate stage.
5. The temperature of the intermediate stage 16 increases slightly.
6. The intermediate stage diode temperature sensor 22 decreases its output voltage.
7. The voltage on the gate of FET $T_1''$ decreases slightly to compensate for the increases in noise voltage.

If the noise voltage at the gate of FET $T_1''$ decreases, then the opposite will occur for the aforementioned sequence. What is important to note is that the sequence detailed above shows that electro-thermal feedback reduces the amplitude of the noise voltage. This qualitative explanation is corroborated by the analysis that now follows.

Relating the noise with electro-thermal feedback [$V_N(\omega)$] to the noise without electro-thermal feedback [$V_{NO}(\omega)$] requires evaluating Equation 80 and specifically requires computation of $\delta T_{IN}$ and $\delta T_D$, since $\partial\Delta\Phi(\omega)/\partial T$ is known from Equation 14. The relationship between $\delta T_{IN}$ and $\delta T_D$ is readily obtained from Equations 14. Using superposition, the change in temperature of the intermediate stage in terms of changes in the temperature of the detector stage is given by Equation 50 when $\delta T_S$ is zero. After some algebra, the following expression is obtained:

$$\delta T_D = \frac{[G_2]}{[G_{D1} + G_2 + j\omega C_D]}\delta T_{IN} \qquad (81)$$

Change in quiescent heat delivered to the intermediate stage 14 by the inverting amplifier's FET gate noise voltage fluctuations is given in Equation 51 as $I_H Z_O V_N(\omega)g_M$. For the non-inverting amplifier, voltage gain is represented by $Z_O g_M$. Making the proper substitutions for voltage gain, the representation for the noise power is given by $\delta Q_H = [C_D/2C_{GD}]I_H V_N(\omega)$. Substituting this for $I_H Z_O V_N(\omega)g_M$ in Equation 51, and after some rearrangement, the resulting expression is given by:

$$-[G_{D2} + G_2 + G_3 + j\omega C_{IN}]\delta T_{IN} + G_2\delta T_D + I_H V_N(\omega)\left[\frac{C_D}{2C_{GD}}\right] = 0 \qquad (82)$$

Changes in the temperature of the intermediate stage 16 is readily computed in terms of the noise voltage by substituting Equation 81 into Equation 82, and solving for $\delta T_{IN}$ obtained is:

$$\delta T_{IN}(\omega) = \qquad (83)$$
$$\frac{I_H V_N(\omega)\left[\frac{C_D}{2C_{GD}}\right][G_{D1} + G_2 + j\omega C_D]}{G_2[G_{D1} + j\omega C_D] + (G_{D2} + G_3 + j\omega C_{IN})(G_{D1} + G_2 + j\omega C_D)}$$

Substituting Equation 81 for $\delta T_D$ in Equation 80 and replacing $\delta T_{IN}$ with Equation 83 an expression for the resulting FET gate noise voltage modified by electro-thermal feedback is obtained in terms of the initial noise voltage without feedback and it is given by:

$$V_N(\omega) = \qquad (84)$$
$$\frac{V_{NO}(\omega)}{\left[1 + \frac{-I_H\left[\frac{C_D}{2C_{GD}}\right]\frac{\partial[\Delta\Phi_{IN}(\omega)]}{\partial T_{IN}}[G_{D1} + j\omega C_D]}{G_2(G_{D1} + j\omega C_D) + (G_{D2} + G_3 + j\omega C_{IN})(G_{D1} + G_2 + j\omega C_D)}\right]}$$

Electro-thermal feedback has decreased the noise amplitude and this is evident from the denominator of Equation 84, which is greater than one. The noise reduction depends on the size of the magnitude of the algebraic expression in the denominator. However, it is evident that the better the thermal isolation between the detector 14 and intermediate 16 stages [smaller $G_2$], and the intermediate 16 and heat bath 18 stages, [smaller $G_3$], the lower will be the noise from the readout circuit.

Thus, in designing a USSS based bolometer in accordance with the subject invention, care must be taken to minimize $G_2$ and $G_3$ so that maximum performance can be achieved. Incorporating Equation 84 into Equation 77 yields an expression for the noise and signal applied to the USSS non-inverting FET readout amplifier with electro-thermal feedback effects included and it is given as:

$$V_G(t) = \delta V_{IN}(t) + \sqrt{\int_{-\infty}^{\infty}|V_N(\omega)|^2 \sin^2\left[\frac{\omega t_O}{2}\right]d\omega} \qquad (85)$$

As previously mentioned, the CNC suppresses the low frequency 1/f noise components since the sine squared term inside the integral of Equation 85 provides an "$\omega^2$" term that cancels the divergence from the 1/f noise. The output noise voltage from the non-inverting voltage amplifier depends on the transconductance and the output impedance and is given as:

$$V_O(t) = g_M Z_O \left[ \delta V_{IN}(t) + \sqrt{\int_{-\infty}^{\infty} |V_N(\omega)|^2 \sin^2\left[\frac{\omega t_O}{2}\right] d\omega} \right] \quad (86)$$

The evaluation of the integral inside the square brackets requires use of exponential integrals and these have been tabulated but are not shown for brevity.

Thus what has been shown and described is a sensor which includes a pair of back-to-back temperature sensing silicon diodes connected in an electro-thermal feedback loop including a semiconductor amplifier circuit located in an intermediate stage between a detector stage and a heat bath stage.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An ultra-sensitive electromagnetic radiation sensor assembly, comprising:
   a radiation detection sub-assembly;
   an intermediate stage sub-assembly;
   a heat bath sub-assembly;
   a first thermally responsive temperature sensing element collocated with a thermal absorber element in thermal contact with said radiation detector sub-assembly;
   a second thermally responsive temperature sensing element collocated with and in thermal contact with said intermediate stage sub-assembly;
   a temperature difference signal amplifier located in thermal contact with said intermediate stage sub-assembly together with said second temperature sensing element;
   first thermal isolation support means located between said radiation detection sub-assembly and said intermediate stage subassembly;
   second thermal isolation support means located between said intermediate stage sub-assembly and said heat bath sub-assembly;
   means connecting said first thermally responsive temperature sensing element and the second thermally responsive temperature sensing element so as to generate a temperature difference signal, and wherein said temperature difference signal is coupled to and amplified by said temperature difference signal amplifier and,
   circuit means for removing threshold voltage offsets and low frequency 1/f noise in a readout signal.

2. An ultra-sensitive sensor assembly according to claim 1 wherein said first and second temperature sensing elements are comprised of semiconductor diodes.

3. An ultra-sensitive sensor assembly according to claim 1 wherein said first and second temperature sensing elements are comprised of p/n junction semiconductor diodes.

4. An ultra-sensitive sensor assembly according to claim 1 wherein said first and second temperature sensing elements are comprised of silicon diodes.

5. An ultra-sensitive sensor assembly according to claim 4 wherein said semiconductor diodes are comprised of p/n junction silicon diodes.

6. An ultra-sensitive sensor assembly according to claim 5 wherein said diodes are connected in a series circuit relationship.

7. An ultra-sensitive sensor assembly according to claim 5 wherein said semiconductor diodes are connected in a back-to-back series circuit relationship.

8. An ultra-sensitive sensor assembly according to claim 1 wherein said radiation detection sub-assembly, said first temperature sensing element, and said thermal absorber element form a composite detector stage.

9. An ultra-sensitive sensor assembly according to claim 1 wherein said intermediate stage sub-assembly, said second temperature sensing element, and said temperature difference signal amplifier form a composite intermediate bath stage.

10. An ultra-sensitive sensor assembly according to claim 1
    wherein said first thermal isolation support means comprises low thermal conductance bridge for supporting the radiation detection sub-assembly on the intermediate stage sub-assembly; and
    wherein said second thermal isolation support means comprises a low thermal conductance bridge for supporting the intermediate stage sub-assembly on the heat bath sub-assembly.

11. An ultra-sensitive sensor assembly according to claim 10 and additionally including thermal radiation antenna means located adjacent the thermal absorber element of said detector sub-assembly and being coupled to said first temperature sensing element thereon.

12. An ultra-sensitive sensor assembly according to claim 1 wherein said first and second temperature sensing elements are comprised of semiconductor diodes connected in back-to-back circuit relationship to said temperature difference signal amplifier and wherein said circuit means comprises a sample and hold capacitor and switch means coupled between said back-to-back diodes and said temperature difference signal amplifier means.

13. An ultra-sensitive sensor assembly according to claim 12 wherein said temperature difference signal amplifier means includes at least one transistor coupled to said back-to-back diodes.

14. An ultra-sensitive sensor assembly according to claim 13 wherein said temperature difference signal amplifier means includes a pair of transistors coupled to each end of said back-to-back diodes.

15. A sensor assembly according to claim 14 wherein said transistors are coupled as inverting amplifiers to each end of said back-to-back diodes.

16. A sensor assembly according to claim 15 and additionally including a transistor connected in cascode circuit relationship with one of said transistors coupled to said back-to-back diodes.

17. A sensor assembly according to claim 14 wherein said transistors are coupled as non-inverting amplifiers to each end of said back-to-back diodes.

* * * * *